United States Patent
Haas et al.

(10) Patent No.: US 9,049,676 B2
(45) Date of Patent: Jun. 2, 2015

(54) ENHANCED SPATIAL MODULATION

(75) Inventors: Harald Haas, Edinburgh (GB); Marco Di Renzo, Asnieres-sur-Seine (FR)

(73) Assignee: The University Court of the University of Edinburgh, Edinburgh (GB)

( * ) Notice: Subject to any disclaimer, the term of this patent is extended or adjusted under 35 U.S.C. 154(b) by 203 days.

(21) Appl. No.: 13/580,827

(22) PCT Filed: Feb. 22, 2011

(86) PCT No.: PCT/GB2011/000246
§ 371 (c)(1),
(2), (4) Date: Nov. 9, 2012

(87) PCT Pub. No.: WO2011/104502
PCT Pub. Date: Sep. 1, 2011

(65) Prior Publication Data
US 2013/0058390 A1    Mar. 7, 2013

(30) Foreign Application Priority Data
Feb. 23, 2010    (GB) .................................. 1003038.5

(51) Int. Cl.
*H04B 7/02*    (2006.01)
*H04W 52/42*    (2009.01)
*H04B 7/04*    (2006.01)
*H04B 7/06*    (2006.01)

(52) U.S. Cl.
CPC ............. *H04W 52/42* (2013.01); *H04B 7/0426* (2013.01); *H04B 7/0602* (2013.01); *H04B 7/0697* (2013.01)

(58) Field of Classification Search
CPC .......................................................... H04B 7/02
USPC .......................................... 375/267, 295, 299
See application file for complete search history.

(56) References Cited

U.S. PATENT DOCUMENTS

| | | | |
|---|---|---|---|
| 2002/0094783 A1* | 7/2002 | Chau et al. .................... | 455/67.1 |
| 2006/0120469 A1* | 6/2006 | Maltsev et al. ................ | 375/260 |
| 2007/0014377 A1* | 1/2007 | Pirak et al. ..................... | 375/267 |
| 2008/0037673 A1  | 2/2008 | Ahn et al. | |
| 2008/0075033 A1* | 3/2008 | Shattil ............................ | 370/328 |
| 2008/0317014 A1* | 12/2008 | Veselinovic et al. .......... | 370/380 |
| 2009/0042594 A1* | 2/2009 | Yavuz et al. ................... | 455/522 |
| 2009/0042596 A1* | 2/2009 | Yavuz et al. ................... | 455/522 |
| 2013/0126713 A1* | 5/2013 | Haas et al. .................. | 250/208.2 |

OTHER PUBLICATIONS

Mesleh R. et al., "Spatial Modulation", IEEE Transactions on Vehicular Technology, IEEE Service Center, Piscataway, NJ (US), vol. 57, No. 4, Jul. 1, 2008, pp. 2228-2241.

(Continued)

*Primary Examiner* — Jaison Joseph
(74) *Attorney, Agent, or Firm* — Alston & Bird LLP

(57) ABSTRACT

A method of spatial modulation and associated transmission apparatus, receiver apparatus, computer program product and system for identifying a transmitter element within a transmission array of at least two transmitter elements, wherein a signal is transmitted by one active transmitter element at a time over a channel to a receiver. Power is allocated to the transmitter elements, wherein the power is allocated differently between at least two transmitter elements. The transmitted data is received at the receiver. The location of the active transmitter element is detected using knowledge of the power allocated to the transmitter elements.

31 Claims, 8 Drawing Sheets

(56) References Cited

OTHER PUBLICATIONS

Jeyadeepan Jeganathan et al., "Space Shift Keying Modulation for MIMO Channels", IEEE Transactions on Wireless Communications, IEEE Service Center, Piscataway, NJ (US), vol. 7, No. 7, Jul. 1, 2009, pp. 3692-3703.

Mesleh R. et al., "Spatial Modulation—A New Low Complexity Spectral Efficiency Enhancing Technique", Communications and Networking in China, 2006, Chinacom '06. First International Conference On, IEEE, PI, Oct. 1, 2006, pp. 1-5.

Mesleh R. et al., "On the Performance of Trellis Coded Spatial Modulation", 2009 International ITG Workshop on Smart Antennas (WSA 2009), Berlin, Germany, Feb. 16-18, [online] Feb. 16, 2009, pp. 1-8. Retrieved from the Internet: URL:http://www.eurasip.org/Proceedings/Ext/WSA2009/manuscripts/9305.pdf.

Chau et al., "Space Modulation on Wireless Fading Channels", Department of Electrical Engineering, Yuan-Ze University, Taiwan 320, 0-7803-7005-8/01, 2001 IEEE, pp. 1668-1671.

Jeganathan et al., "Spatial Modulation: Optimal Detection and Performance Analysis", 1089-7798/08, IEEE Communications Letters, vol. 12, No. 8, Aug. 2008, pp. 545-547.

International Search Report from corresponding international Application No. PCT/GB2011/000246, filed Feb. 22, 2011.

\* cited by examiner

ENHANCED SPATIAL MODULATION

FIELD OF THE INVENTION

The present invention relates to wireless communication systems. More particularly, the present invention relates to a novel and improved system and method to enhance the performance of wireless communication systems employing multiple transmitter elements and at least one receiver element, sometimes referred to as multiple input multiple output (MIMO) systems for multiple receiver elements and multiple input single output (MISO) systems for a single receiver element.

BACKGROUND OF THE INVENTION

In multiple input multiple output and multiple input single output systems (MIMO and MISO), Spatial Modulation is used. The fundamental component of Spatial Modulation is the exploitation of the spatial domain, i.e., the spatial position of the antenna at the transmitter-side, as a means for sending information through a wireless fading channel. In particular, the underlying principle of Spatial Modulation is twofold: i) at the transmitter-side, a one-to-one mapping of information data to transmit antennas, thus allowing them to convey information, and ii) at the receiver-side, the exploitation, thanks to the stochastic properties of wireless fading channels, of distinct multipath profiles received from different transmit antennas.

Contributions which are available for Spatial Modulation have been based on the same assumption: a uniform power allocation mechanism among the active transmit antennas is assumed a priori. The key problem of optimizing the effective spatial constellation pattern of Spatial Modulation has been addressed. However, the known optimization is based on the activation and de-activation of a set of antennas rather than on power allocation mechanisms. A uniform power allocation strategy is implicitly retained in the analysis.

Known solutions do also not fully exploit all degrees of freedom and potentialities of Spatial Modulation (SM) concept. In particular, the common limitation of all above techniques for SM is not taking maximum advantage of multiple antennas at the transmitter-side to obtain transmit-diversity gains. As a matter of fact, signal designs and optimal detectors available so far offer a diversity order that depends on the number of receive antennas only. As a consequence, SM methods proposed to date might find limited applicability to low-complexity and low-cost downlink settings and operations, where it is more economical to add equipment to base stations rather than to remote mobile units.

Spatial modulation is considered in: Y. Chau and S.-H. Yu, "Space shift keying modulation", U.S. Pat. No. 9,985,988, Filed Nov. 7, 2001, Pub. Date Jul. 18, 2002; and
Y. A. Chau and S.-H. Yu, "Space modulation on wireless fading channels", IEEE Vehicular Technology Conference— Fall, vol. 3, pp. 1668-1671, October 2001.

The disadvantages of such SM methods are as follows:
Even though two transmit-antennas are employed in the communication link, the SM proposal of Chau and Yu offers a diversity order only equal to one.

The error probability in depends only on the channel power gain of the wireless link related to the antenna that can be either switched on or off during data transmission. As a consequence, in an adaptive system and for optimizing the system performance, the antenna with the best (average) channel conditions may be chosen as the one to be switched on and off.

The SM concept introduced by Chau and Yu, which is called Space Shift Keying (SSK) in which only one transmit-antenna is activated when message 1 has to be sent, while both transmit-antennas are activated when a message 2 needs to be sent. Thus when message 2 has to be sent, each antenna at the transmitter-side is required to transmit a signal with a corresponding energy. This leads to a power consumptions cost which is twice with respect to that required when message 1 is sent.

Other SM methods are proposed in: C.-W. Ahn, S.-B. Yun, E.-S. Kim, H. Haas, R. Mesleh, T.-I. Hyon, and S. McLaughlin, "Spatial modulation method and transmitting and receiving apparatuses using the same in a multiple input multiple output system", Filed Jul. 10, 2007, Pub. Date Feb. 14, 2008;

R. Y. Mesleh, H. Haas, S. Sinanovic, C. W. Ahn, and S. Yun, "Spatial modulation", IEEE Transactions on Vehicular Technology, vol. 57, no. 4, pp. 2228-2241, July 2008; and J. Jeganathan, A. Ghrayeb, and L. Szczecinski, "Spatial modulation: Optimal detection and performance analysis", IEEE Communications Letters, vol. 12, no. 8, pp. 545-547, August 2008.

The disadvantages of such SM methods are as follows:
Even though two transmit-antennas are employed in the communication link, the SM proposal in Mesleh et al and Jeganathan et al offers, similar to Chau and Yu, a diversity order only equal to 1.

The error probability depends on both complex channel gains and, in particular, is a function of the difference of them. As a consequence, depending on the instantaneous channel conditions, constructive and destructive combinations can take place, thus preventing the full exploitation of the two transmit-antennas for diversity purposes.

The error probability is a function of the spatial correlation coefficient and, in particular, the more the wireless links are correlated, the worse the error probability is.

OBJECTS OF THE INVENTION

One object of the present invention is to provide a method, system and detector that overcomes at least some of the problems associated with the prior art.

A further object of the present invention is to improve an error probability for wireless fading channels, i.e. increase the robustness and reliability of data transmission.

A further object of the present invention is to improve spectral efficiency for varying channel conditions.

A further object of the present invention is to design a wireless communication system, based on Spatial Modulation, with transmit-diversity capabilities.

SUMMARY OF THE INVENTION

According to an aspect of the present invention, there is provided a method of spatial modulation to identify a transmitter element within a transmission array of at least two transmitter elements, each transmitter element being located at a transmitter, wherein a signal is transmitted by one active transmitter element at a time over a channel to a receiver, the method comprising:
allocating power to the transmitter elements wherein the power is allocated differently between at least two transmitter elements,
receiving transmitted data at the receiver and
detecting location of the active transmitter element using knowledge of the power allocated to the transmitter elements.

Preferably, the method further comprises:
determining an error probability of the signal and determining a power allocation model for the transmitter elements by optimizing the average bit error probability of the signal, wherein the step of allocating power to the transmitter elements is performed according to the determined power allocation model.

Preferably, the error probability comprises an average bit error probability.

Preferably, the channel comprises a wireless link. More preferably, the channel comprises an optical wireless link, for example using a coherent or incoherent light source.

Preferably, the transmitter elements could include radio frequency antennae or other signal emitters, such as loudspeakers, ultrasound transmitters, multiple LEDs (light emitting diodes), etc.

The receiver preferably comprises at least one receiver element, which can be for example a detector for radio frequency, acoustic or ultrasound signals or a photo detector.

Preferably, each channel has a defined impulse response which can include a fading condition of the related channel as gain. The fading condition may be determined by a statistical method, such as Rayleigh fading or Nakagami-m fading. In an alternative embodiment, in which little or no fading is present, an additive white Gaussian noise distribution can be used.

The impulse response of each channel may also include a delay of the related channel which can be independent and uniformly distributed at least in a predetermined interval. The delay can be known at the receiver. A time-synchronization may be performed at the receiver.

The impulse response of each channel may also include a phase of the related channel.

Preferably, the optimizing of the average bit error probability, also referred to as ABEP, includes a minimization of the average bit error probability.

Preferably, the average bit error probability of the signal is a function of the impulse responses of the respective channels.

Preferably, in one embodiment, the receiver provides full information of the channel state, which is also referred to as channel state information (CSI). The full channel state information comprises the knowledge of the gain, phase and delay of each channel. Preferably, phase information is not necessarily required, for example when incoherent light sources are used as transmitter elements. In alternative embodiments, other receivers, for example with partial channel state information, which have been developed in relation with spatial modulation performance analyses, can be used.

The respective channels can be correlated or uncorrelated.

Correlation coefficients between the channels can be determined at the receiver.

Preferably, the total power, i.e. the sum of the energies transmitted when data is transmitted from each transmitter element of the transmission array to the receiver, is fixed to a given value. In an alternative embodiment, a power control can be applied in which the total power depends on the channel environment and/or propagation of the signal.

The optimization or minimization of the average error probability can be obtained by using one or more either analytical or numerical methods.

Preferably, a model of power allocation is generated at the receiver.

The model of power allocation may consider the correlation coefficients between the channels. The model of power allocation may also consider the impulse responses, and/or the fading condition in particular, of the channels.

More preferably, the location of a transmitter element is detected by using data of the model of power allocation.

Preferably, the active transmitter element can transmit modulated data, thereby conveying data by both an index of the transmitter element and by the modulated signal.

Preferably, each channel has a unique impulse response, and the method further comprises:

predetermining a power allocation sequence of a transmitter element, in the step of allocating power to the transmitter elements, allocating the power allocation sequence to the transmitter elements, and in the step of detecting location of the active transmitter element, using knowledge of the power allocation sequence of the active transmitter element.

Preferably, the channel comprises a wireless link. More preferably, the channel comprises an optical wireless link, for example using a coherent or incoherent light source.

Preferably, the transmitter elements could include radio frequency antennae or other signal emitters, such as loudspeakers, ultrasound transmitters, multiple LEDs (light emitting diodes), etc.

The receiver preferably comprises at least one receiver element, which can be for example a detector for radio frequency, acoustic or ultrasound signals or a photo detector.

Preferably, each channel has a defined impulse response which can include a fading condition of the related channel as gain. The fading condition may be determined by a statistical method, such as Rayleigh fading or Nakagami-m fading. In an alternative embodiment, in which little or no fading is present, an additive white Gaussian noise distribution can be used.

The impulse response of each channel may also include a delay of the related channel which can be independent and uniformly distributed at least in a predetermined interval. The delay can be known at the receiver. A time-synchronization may be performed at the receiver.

The impulse response of each channel may also include a phase of the related channel.

The respective channels can be correlated or uncorrelated.

The power allocation sequences allocated to the transmitter element can comprise a random sequence.

Preferably, the power allocation sequences allocated to different transmitter elements are provided such that they are easily distinguishable from each other by using a corresponding detection method.

The power allocation sequence allocated to a transmitter element can be stored in a storage, such as a look-up table, at the receiver to be accessed when the location of a transmitter element is to be detected.

Preferably, the active transmitter element can transmit modulated data, thereby conveying data by both an index of the transmitter element and by the modulated signal.

Preferably, the method further comprises:

receiving transmitted training data at the receiver during a training phase, predetermining a power allocation sequence according to received training data, in the step of allocating power to the transmitter elements, allocating the power allocation sequence to the transmitter elements, terminating the training phase, receiving transmitted data at the receiver after the training phase, and in the step of detecting location of the active transmitter element, using knowledge of the power allocation sequence of the active transmitter element.

Preferably, the channel comprises a wireless link. More preferably, the channel comprises an optical wireless link, for example using a coherent or incoherent light source.

Preferably, the transmitter elements could include radio frequency antennae or other signal emitters, such as loudspeakers, ultrasound transmitters, multiple LEDs (light emitting diodes), etc.

The receiver preferably comprises at least one receiver element, which can be for example a detector for radio frequency, acoustic or ultrasound signals or a photo detector.

Preferably, each channel has a defined impulse response which can include a fading condition of the related channel as gain. The fading condition may be determined by a statistical method, such as Raleigh fading or Nakagami-m fading.

The impulse response of each channel may also include a delay of the related channel which can be independent and uniformly distributed at least in a predetermined interval. The delay can be known at the receiver. A time-synchronization may be performed at the receiver.

The impulse response of each channel may also include a phase of the related channel.

Preferably, in one embodiment, the receiver provides full information of the channel state, which is also referred to as channel state information (CSI). The full channel state information comprises the knowledge of the gain, phase and delay of each channel. Preferably, phase information is not necessarily required, for example when incoherent light sources are used as transmitter elements. In alternative embodiments, other receivers, for example with partial channel state information, which have been developed in relation with spatial modulation performance analyses, can be used.

Preferably, the full channel state information (full CSI) is obtained during the training phase prior to transmitting data.

The respective channels can be correlated or uncorrelated.

The channel state information may comprise correlation coefficients between the channels.

The received data prior to allocating the power allocation sequence to the transmitter element may comprise and may consider channel state information, such as correlation coefficients between the channels or the impulse response of the channels to determine the power allocation sequence of the related transmitter elements.

The power allocation sequence allocated to a transmitter element can be stored in a storage, such as a look-up table, at the receiver to be accessed when the location of a transmitter element is to be detected.

Preferably, the active transmitter element can transmit modulated data, thereby conveying data by both an index of the transmitter element and by the modulated signal.

The invention as stated above improves the performance of Spatial Modulation by for example allocating in an opportunistic fashion the transmission power, while keeping the simplicity of Spatial Modulation at the transmitter and receiver side. The invention allows to artificially create unbalanced fading conditions to make the transmit-receive wireless links more distinguishable to each other. Furthermore, the present invention helps to reduce the effect of spatial channel correlation.

Thus, with the present invention the determination of the location of an active transmitter element within an array of at least two transmitter elements is facilitated.

The invention can be applied to an arbitrary number of transmitter elements at the transmitter and receiver elements at the receiver. Moreover, the invention can be applied to distributed and virtual MIMO systems using Spatial Modulation.

According to an aspect of the present invention, there is provided a transmission apparatus for identifying a transmitter-element within a transmission array of at least two transmitter-elements, each transmitter-element being located at a transmitter, wherein a signal is transmitted by one active transmitter-element at a time over a channel to a receiver, the transmission apparatus comprising:
a power allocator to allocate power to the transmitter-elements wherein the power is allocated differently between at least two transmitter-elements.

Preferably, the transmission apparatus further comprises:
a calculator to determine a power allocation model for the transmitter-elements by optimizing an average bit error probability of the signal,
wherein the power allocator allocates power to the transmitter-elements according to the determined power allocation model.

Preferably, each channel has a unique impulse response, and the transmission apparatus further comprises a sequence predetermination module to predetermine a power allocation sequence of a transmitter element,
wherein the power allocator allocates the power allocation sequence to the transmitter elements.

According to an aspect of the present invention, there is provided a receiver apparatus for identifying a transmitter-element within a transmission array of at least two transmitter-elements, each transmitter-element being located at a transmitter, wherein a signal is transmitted by one active transmitter-element at a time over a channel to the receiver apparatus,
the receiver apparatus being configured to receive transmitted data and comprising a location detector to detect location of the active transmitter-element using knowledge of the power allocated to the transmitter-elements.

Preferably, the receiver apparatus further comprises:
a channel estimator to determine an error probability of the signal and
a model generator to determine a power allocation model for the transmitter-elements by optimizing the average bit error probability of the signal.

Preferably, each channel has a unique impulse response, and the location detector, in detecting location of the active transmitter element, is operable to use knowledge of a power allocation sequence of the active transmitter element.

Preferably, the receiver apparatus is operable to receive transmitted training data at the receiver apparatus during a training phase, to feed back training data to a transmitter apparatus for predetermining a power allocation sequence according to the training data and for allocating a power allocation sequence to the transmitter elements,
and the location detector, in detecting the location of the active transmitter element, is operable to use knowledge of the power allocation sequence of the active transmitter element.

According to a further aspect of the invention, there is provided a spatial modulation system for identifying a transmitter-element within a transmission array of at least two transmitter-elements, each transmitter-element being located at a transmitter, wherein a signal is transmitted by one active transmitter-element at a time over a channel to a receiver, the system comprising the transmitter apparatus and the receiver apparatus.

The spatial modulation system may incorporate any of the features of the other aspects herein.

According to an aspect of the present invention, there is provided a computer program product containing one or more sequences of machine-readable instructions for spatial modulation to identify a transmitter-element within a transmission array of at least two transmitter-elements, each transmitter-element being located at a transmitter, wherein a signal is transmitted by one active transmitter-element at a time over a channel to a receiver,
the instructions being adapted to cause one or more processors to:
allocate power to the transmitter-elements wherein the power is allocated differently between at least two transmitter-elements,
receive transmitted data at the receiver and
detect location of the active transmitter-element using knowledge of the power allocated to the transmitter-elements.

The computer program product may incorporate any of the features of the other aspects herein.

According to a further aspect of the invention, there is provided a method of spatial modulation to identify a transmitter within a transmission array of at least two transmitter elements, wherein a signal is transmitted by one active transmitter element at a time over a channel to a receiver,
the method comprising:
predetermining a waveform of the signal prior to transmitting it to the receiver,
wherein channel signatures of two different channels form a pair of channel signatures respectively,
and wherein the waveform is predetermined to exploit the pair of channel signatures to cause a difference between signals transmitted over the different channels,
receiving transmitted data at the receiver, and
detecting location of the active transmitter element using the difference between the transmitted signals.

Preferably, the channels signatures comprise propagation delays.

Preferably, the pair of channel signatures is subject to an orthogonality condition.

Preferably, the channel comprises a wireless link. More preferably, the channel comprises an optical wireless link, for example using a coherent or incoherent light source.

Preferably, the transmitter elements could include radio frequency antennae or other signal emitters, such as loudspeakers, ultrasound transmitters, multiple LEDs (light emitting diodes), etc.

The receiver preferably comprises at least one receiver element, which can be for example a detector for radio frequency, acoustic or ultrasound signals or a photo detector.

The waveform of the signal can be subject to a delta function, such as a Dirac's delta function.

Preferably, the signals transmitted to the receiver are sent with a similar, more preferably with an equal, energy from each of the transmitter elements.

Preferably, each channel has a defined impulse response which can include a fading condition of the related channel as gain. The fading condition may be determined by a statistical method, such as Rayleigh fading or Nakagami-m fading.

The propagation delay of the related channel can be independent and uniformly distributed at least in a predetermined time interval, in particular in the interval $[0, T_m)$, wherein $T_m$ is the signalling internal for all signals being sent from the transmitter elements.

The impulse response of each channel may also include a phase of the related channel.

Preferably, in one embodiment, the receiver provides full information of the channel state, which is also referred to as channel state information (CSI). The full channel state information comprises the knowledge of the gain, phase and delay of each channel. Preferably, phase information is not necessarily required, for example when incoherent light sources are used as transmitter elements. In alternative embodiments, other receivers, for example with partial channel state information, which have been developed in relation with spatial modulation performance analyses, can be used.

Preferably, the full channel state information (full CSI) is obtained during the training phase prior to transmitting data.

The respective channels can be correlated or uncorrelated.

The channel state information may comprise correlation coefficients between the channels.

The Spatial Modulation concept is further improved by the introduction of an optimal signal design at the transmitter and an optimal detection algorithm at the receiver.

Furthermore, transmit-diversity gains for Spatial Modulation are allowed according to one aspect of the invention. The Spatial Modulation according to this invention is inherently more robust than other Spatial Modulation proposals to spatial correlation of fading.

When the receiver is equipped with multiple antennas, the invention offers transmit- and receive-diversity at the same time.

With regard to the Spatial Modulation assisted by time-orthogonal signal design, a feedback channel from the receiver to the transmitter may be required to have the relative times of arrival (i.e., timing information) of all transmitter element indexes after propagation through the wireless channel. The synchronization unit at the receiver can estimate these delays during a training phase before data transmission, and send back them to the transmitter via a control channel. Upon reception of this information, the transmitter can select the best signal design to guarantee signal orthogonality at the receiver via a Maximum Likelihood (ML) optimal detector described in further detail below.

According to a further aspect of the invention, there is provided a transmission apparatus for identifying a transmitter within a transmission array of at least two transmitter elements, wherein a signal is transmitted by one active transmitter element at a time over a channel to a receiver, the transmission apparatus comprising:
a waveform calculator to predetermine a waveform of the signal prior to transmitting it to the receiver,
wherein channel signatures of two different channels form a pair of channel signatures respectively,
and wherein the waveform is predetermined to exploit the pair of channel signatures to cause a difference between signals transmitted over the different channels.

According to a further aspect of the invention, there is provided a spatial modulation system for identifying a transmitter-element within a transmission array of at least two transmitter-elements, each transmitter-element being located at a transmitter, wherein a signal is transmitted by one active transmitter-element at a time over a channel to a receiver, the system comprising the transmitter apparatus and a receiver apparatus operable to receive transmitted data and detect location of the active transmitter element using the difference between the transmitted signals.

The spatial modulation system may incorporate any of the features of the other aspects herein.

According to a further aspect of the invention, there is provided a computer program product containing one or more sequences of machine-readable instructions for spatial modulation to identify a transmitter within a transmission array of at least two transmitter elements, wherein a signal is transmitted by one active transmitter element at a time over a channel to a receiver,
the instructions being adapted to cause one or more processors to:

predetermine a waveform of the signal prior to transmitting it to the receiver,
wherein channel signatures of two different channels form a pair of channel signatures respectively,
and wherein the waveform is predetermined to exploit the pair of channel signatures to cause a difference between signals transmitted over the different channels,
receive transmitted data at a receiver, and
detect location of the active transmitter element using the difference between the transmitted signals.

The computer program product may incorporate any of the features of the other aspects herein.

DESCRIPTION OF THE DRAWINGS

Reference will now be made by way of example, to the accompanying drawings, in which.

DESCRIPTION

To understand the motivation of the proposed power allocation method and the substantial performance improvement that can be achieved with it over wireless channels, some numerical examples are now described. The examples are shown in FIGS. 1 to 4. These figures represent the ABEP of a $N_t \times 1$ SM-MIMO system, with $N_t$ denoting the number of transmitter elements at a transmitter. Throughout this application, when the term "transmitters" or "transmit-antenna" is used, this refers to transmitter elements at the transmitter. Accordingly, the term "receivers" or "receive-antenna" refers to receiver elements.

FIGS. 1 to 4 are obtained by considering a Nakagami-m fading channel with parameters $\{m_i\}_{i=1}^{N_t}$ and $\{\Omega_i\}_{i=1}^{N_t}$ on a wireless link between an i-th transmit-antenna and a single receive-antenna. FIGS. 1 to 4 are obtained by assuming a uniform power allocation mechanism among the transmit-antennas ($E_m/N_0$ denotes the average Signal-to-Noise Ratio, SNR, for each wireless link), but for balanced (i.e., $\{\Omega_i\}_{i=1}^{N_t}$ are the same in all wireless links) and unbalanced (i.e., $\{\Omega_i\}_{i=1}^{N_t}$ can be different among the various wireless links) fading channels. It will be described in further detail below that the latter system setup is equivalent to have balanced fading channels with a non-uniform power allocation among the transmit-antennas. FIGS. 1 to 4 show both Monte Carlo simulations and an accurate analytical framework. The analytical model will be described in more detail below/with regard to FIG. 5.

Figure 1:
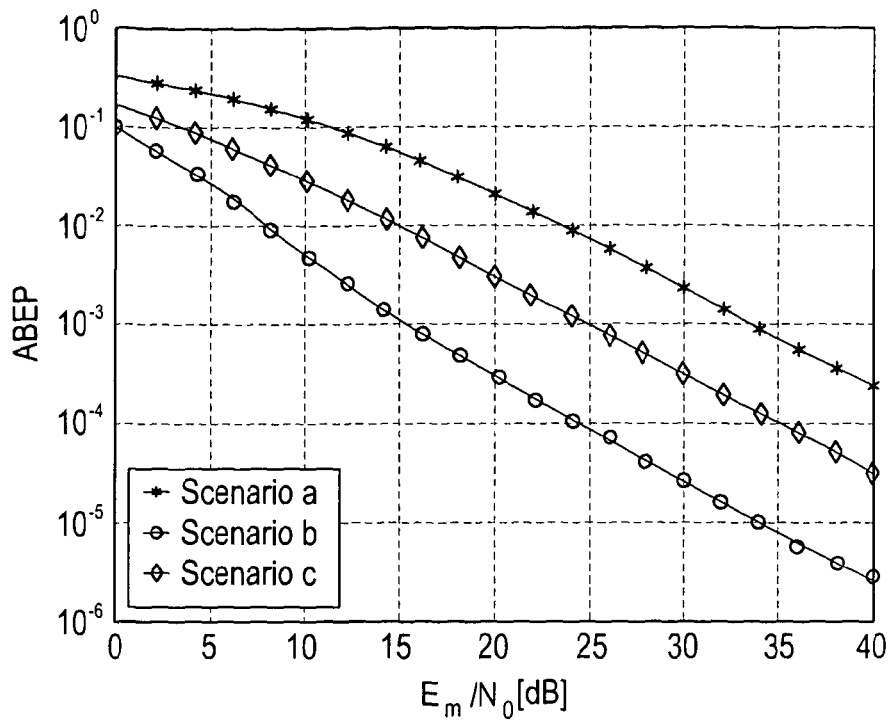
FIG. 1 is a graph showing the Average Bit Error Probability (ABEP) when a fading correlation model is considered assuming a uniform power allocation mechanism among the transmit antennas according to the prior art.

In FIG. 1, the ABEP is shown when a fading correlation model is considered. The following scenarios are applied:
Scenario a: $f_1=f_2=1$, $\Omega_1=\Omega_2=2/3$, $\rho_1=0.50$, $\rho_2=\rho_3=\rho_4=0.45$. Scenario b: $f_1=1$, $f_2=2.5$, $\Omega_1=1$, $\Omega_2=20/3$, $\rho_1=0.50$, $\rho_2=\rho_3=\rho_4=0.45$.
Scenario c: $f_1=f_2=1$, $\Omega_1=2/3$, $\Omega_2=20/3$, $\rho_1=0.50$, $\rho_2=\rho_3=\rho_4=0.45$. $N_t=2$. Both Monte Carlo simulation (markers) and analytical model (solid lines) are shown. The ABEP changes significantly with the correlation coefficient ($\rho_1$, $\rho_2$, $\rho_3$, $\rho_4$) and the fading severity ($f_1$, $f_2$). This latter phenomenon can be observed by comparing Scenario b and Scenario c in FIG. 1, where a non-negligible performance gap is observable (for the same power imbalance ratio $\Omega_2/\Omega_1$). This result emphasizes that the performance of SM is strongly affected by the characteristics of the wireless channel and the fading distribution as well, since Scenario c is representative of a Rayleigh fading channel.

Figure 2:
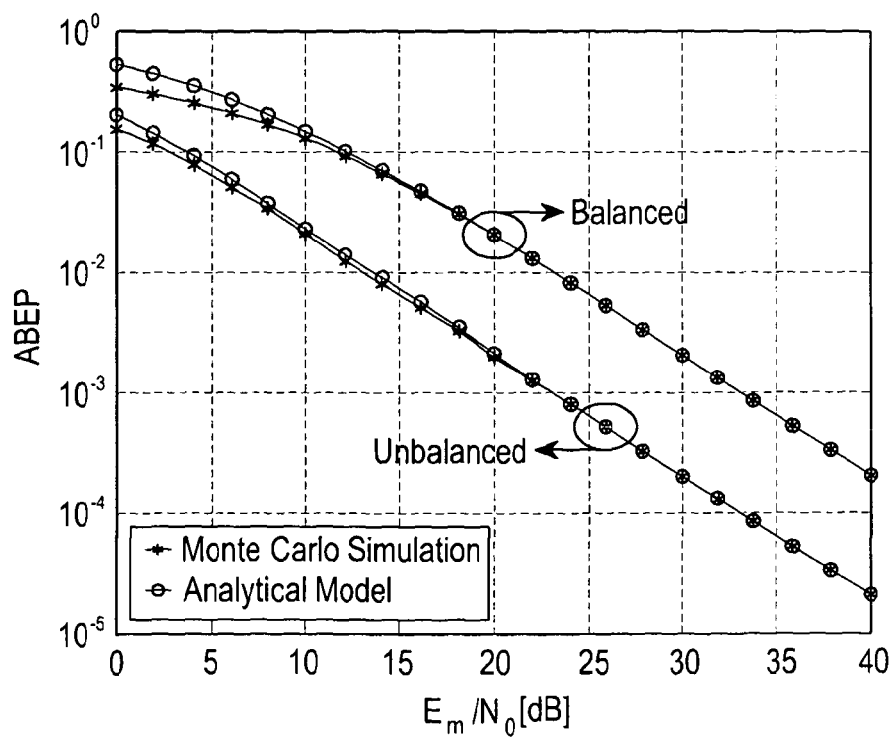
FIG. 2 is a graph showing an analysis of the ABEP for uncorrelated fading channels and for a different power imbalance among wireless links assuming a uniform power allocation mechanism among the transmit antennas according to the prior art.

In FIG. 2, the ABEP is shown for uncorrelated fading channels and for a different power imbalance among the wireless links. For the balanced fading channel, $\Omega_1=\Omega_1=\Omega_1=\Omega_1=1$ is applied. For the unbalanced fading channel, $\Omega_1=1$, $\Omega_1=4$, $\Omega_1=8$, $\Omega_1=12$ is applied. The fading channels are uncorrelated, $f_1=f_2=f_3=f_4=2.5$ and $N_t=4$. Both Monte Carlo simulation and analytical model are shown. A significant performance improvement can be observed when the power links are unbalanced. The reason for this behaviour lies in the fact that power imbalance makes the wireless links more distinguishable to each other, thus making the decision process at the receiver more reliable and, thus, improving the ABEP.

Figure 3:
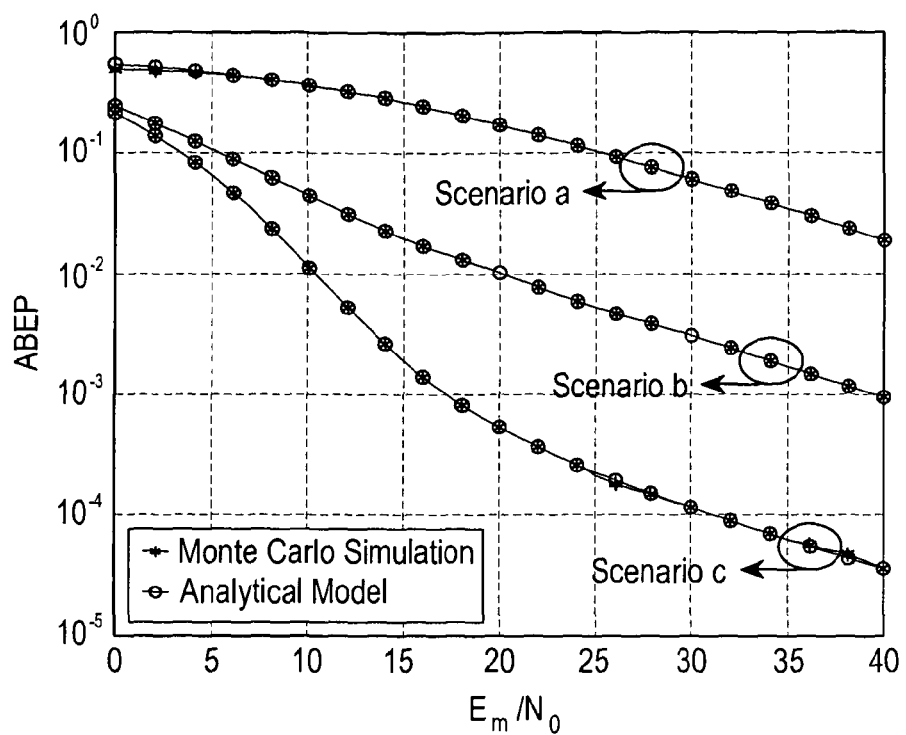
FIG. 3 is a graph showing an analysis of the ABEP for correlated fading channels and for a different power imbalance among the wireless links assuming a uniform power allocation mechanism among the transmit antennas according to the prior art.

In FIG. 3, the ABEP is shown for correlated fading channels and for a different power imbalance among the wireless links. The following scenarios are applied:
Scenario a: $f_1=1$, $f_2=5$, $\Omega_1=\Omega_1=1$.
Scenario b: $f_1=2$, $f_2=5$, $\Omega_1=10$, $\Omega_1=1$.
Scenario c: $f_1=5$, $f_2=2$, $\Omega_1=10$, $\Omega_1=1$.
Further, $\rho_1=\rho_2=\rho_3=0.45$, $\sigma_4=-0.45$ is applied and $N_t=2$. Both Monte Carlo simulation and analytical model are shown. Similar to FIG. 2, a better performance can be achieved for unbalanced fading channels. Furthermore, an interesting comment can be made by carefully observing, in particular, the curves related to Scenario b and Scenario c. In both system setups the first wireless link has a greater power gain, but in Scenario b the fading severity ($f_1$) of the first link is smaller than the fading severity ($f_2$) of the second link. A significant performance difference, which highlights that besides the average power also the fading severity can remarkably alter the system performance.

Figure 4:
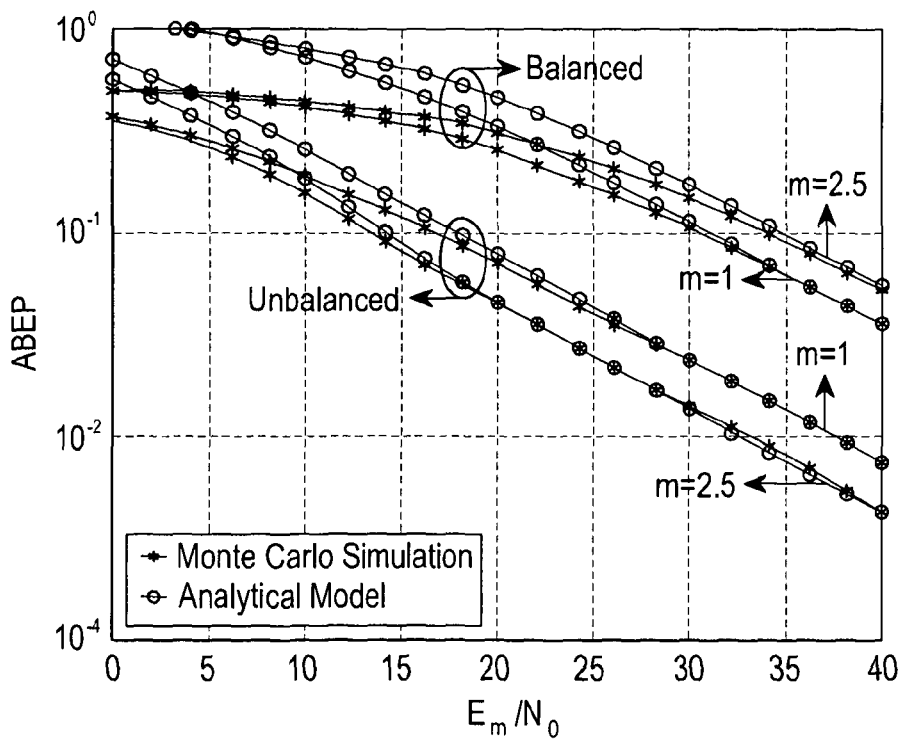
FIG. 4 is a graph showing the ABEP for correlated fading assuming a uniform power allocation mechanism among the transmit antennas according to the prior art.

In FIG. 4, the ABEP for correlated fading is shown. For the balanced fading channel, $\Omega_1=\Omega_2=\Omega_3=\Omega_4=1$ is applied. For the unbalanced fading channel, $\Omega_1=1, \Omega_2=4, \Omega_3=8, \Omega_4=12$ is applied. The fading channels are correlated with the correlation coefficient $\rho_{i,j}=\exp(-d_0|i-j|)$ with $d_0=0.22$ and (i, j) are antenna's indexes (i, j=1, 2, 3, 4). $N_t=4$. Both Monte Carlo simulation and analytical model are shown. The results in FIG. 4 confirm the conclusions already drawn in FIGS. 1 to 3, but also highlight that the fading severity (f) can have a different impact on the ABEP, as far as balanced and unbalanced system setups are considered: A different relation among the curves is noticed.

In summary, the numerical results shown in FIGS. 1 to 4 lead to the following conclusions:

1. The ABEP of SM gets better for unbalanced wireless fading channels.

2. The ABEP of SM depends on the fading severity and channel correlation of the wireless links.

According to an aspect of the present invention, ABEP-driven opportunistic power allocation mechanisms are described that aim at distributing the available power at the transmitter in an optimal fashion by taking into account the actual characteristics of all transmit-receive wireless links. In particular, the method according to this aspect of the present invention will help to make the wireless links more distinguishable among each other in order to emulate unbalanced fading conditions for those scenarios where the channel fading is actually identically distributed.

Figure 5:
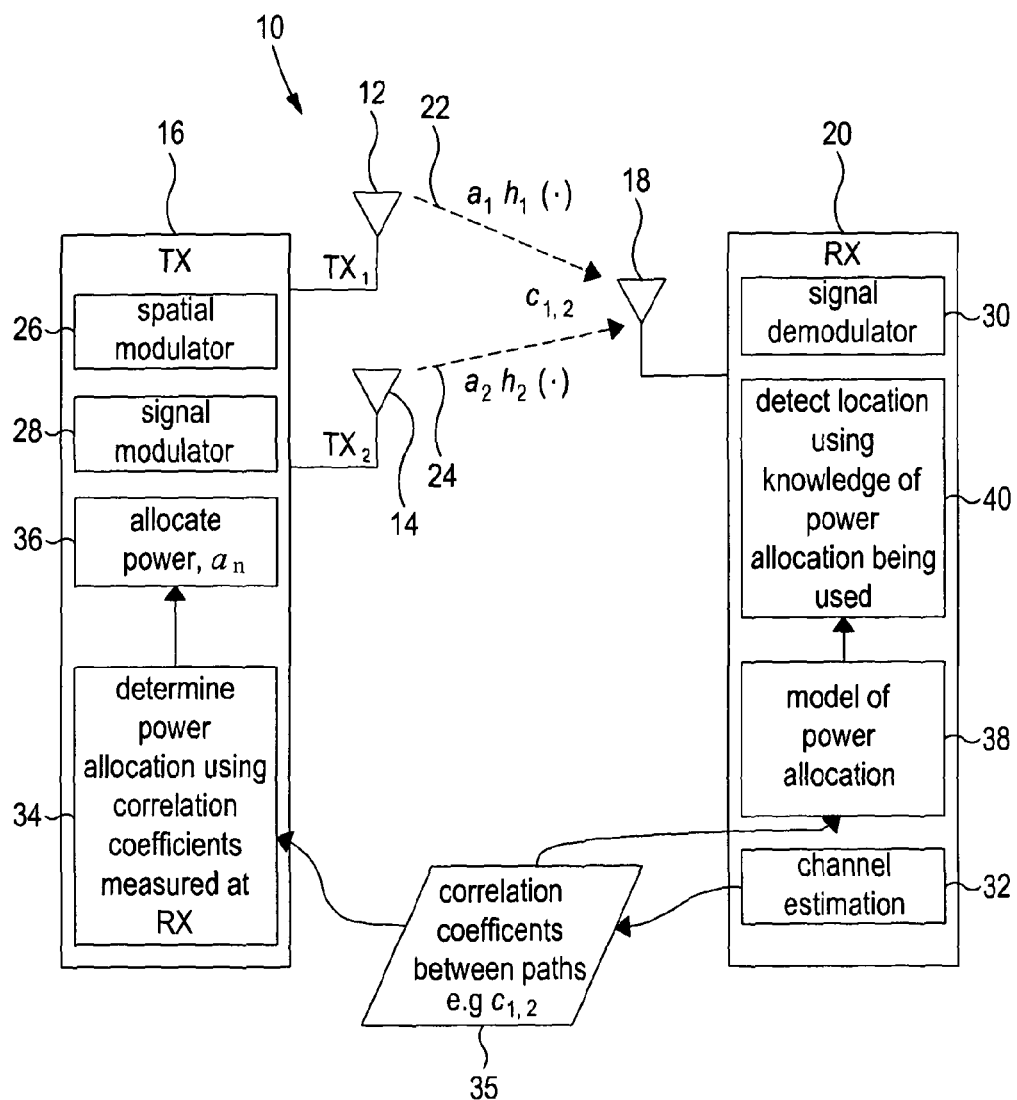
FIG. 5 shows a system setup for SM-MIMO, in accordance with one embodiment of the present invention, by way of example.

In FIG. 5, a system 10 for SM-MIMO is shown by way of example, which is composed by two transmit-antennas 12, 14 (TX$_1$, TX$_2$) at the transmitter 16 (TX) and one receive-antenna 18 at the receiver 20 (RX). The system 10 is used to describe the basic and fundamental idea behind the proposed power allocation method herein below. For analytical simplicity, a Rayleigh fading channel model with correlated channels 22, 24 is considered. However, it is emphasized that the invention outlined herein is applicable to generic MIMO and MISO systems that can be deployed in any wireless fading channel.

The main aim is to show that power imbalance and non-uniform power allocation are equivalent to each other.

The symbols and terms used herein are defined as follows:

A complex-envelope representation of signals is used throughout the description.

$j=\sqrt{-1}$ is the unitary unit.

$$\delta(t) = \begin{cases} 1 & \text{if } t = 0 \\ 0 & \text{if } t \neq 0 \end{cases}$$

is the Dirac's delta function.

$(x \otimes y)(t)=\int_{-\infty}^{+\infty} x(\xi)y(t-\xi)d\xi$ is the convolution operator of signals $x(\bullet)$ and $y(\bullet)$.

$(\bullet)^*$ denotes complex-conjugate.

$|\bullet|^2$ denotes the square absolute value.

$E\{\bullet\}$ denotes expectation operator.

$Re\{\bullet\}$ denotes real part operator.

$Pr\{\bullet\}$ means probability.

$G \sim N(\mu_G, \mu_G^2)$ is a Gaussian distributed Random Variable (RV) with mean $\mu_G$ and standard deviation $\sigma_G$.

$A \sim R(\bullet; \sigma_A^2)$ is a Raleigh distributed RV with $E\{A^2\}=2\sigma_A^2$ $P_{AB}$ denotes the correlation coefficient of RVs A and B.

$Q(x)=(1/\sqrt{2\pi}m)\int_x^{+\infty}\exp(-t^2/2)dt$ is the Q-function.

$\Gamma(x)=\int_0^{+\infty}t^{x-1}\exp(-t)dt$ is the Gamma function.

$m_1$ and $m_2$ denote the two information messages that the transmitter (TX) in FIG. 5 can emit.

$\hat{m}$ Denotes the message estimated at the receiver.

$E_{m_1}=\zeta_1 E_m$ and $E_{m_2}=\zeta_2 E_m$ are the energies transmitted for the information messages $m_1$ and $m_2$, respectively.

$\zeta_1$ and $\zeta_2$ are power scaling variables. $E_m$ is a constant factor.

$T_m=T_{m_1}=T_{m_2}$ denote the signalling internal for both information messages $m_1$ and $m_2$.

$h_1(t)=\beta_1\exp(j\phi_1)\delta(t-\tau_1)$ is the channel impulse response from antenna TX$_1$ to the receive-antenna, and $\beta_1$, $\phi_1$, and $\tau_1$ denote the gain, phase, and delay of the related wireless link. Moreover, $\alpha_1=\beta_1\exp(j\omega_1)$ denotes the channel's complex gain of the first wireless link.

Analogously, $h_2(t)=\beta_2\exp(j\phi_2)\delta(t-\tau_2)$ is the channel impulse response from antenna TX$_2$ to the receive antenna, and $\alpha_2$, $\phi_2$, and $\tau_2$ denote the gain, phase, and delay of the related wireless link. Moreover, $\alpha_2=\beta_2\exp(j\phi_2)$ denotes the channel's complex-gain of the second wireless link.

For the sake of simplicity, but without loss of generality, a Rayleigh fading is assumed for both wireless links TX$_1$RX and TX$_2$-RX. In particular, $\alpha_1=\alpha_1^R+j\alpha_1^I$ and $\alpha_2=\alpha_2^R+j\alpha_2^I$ with $\alpha_1^R \sim N(0,\sigma_1^2), \alpha_1^I \sim N(0,\sigma_1^2), \alpha_2^R \sim N(0,\sigma_2^2), \alpha_2^I \sim N(0,\sigma_2^2)$ and $\rho_{\alpha_1^R \alpha_1^I}=\rho_{\alpha_2^R \alpha_2^I}=\rho_{\alpha_1^R \alpha_2^I}=\rho_{\alpha_2^R \alpha_1^I}=0$, $\rho_{\alpha_1^R \alpha_2^R}=\rho_{\alpha_1^I \alpha_2^I}=\rho$.

$\tau_1$ and $\tau_2$ are assumed to be independent and uniformly distributed in $[0, T_m]$, but known at the receiver, i.e. perfect time-synchronization is considered.

The receiver is assumed to have full channel state information (CSI), i.e. two triples $(\beta_1, \phi_1, \tau_1)$ and $(\beta_2, \phi_2, \tau_2)$ are perfectly known at the receiver. CSI can be obtained during a training phase before data transmission.

The signals transmitted by antennas TX$_1$ and TX$_2$ are denoted by $s_1(\bullet)$ and $s_2(\bullet)$, respectively, which after passing through the wireless channel becomes $\tilde{s}_1(t)=(s_1 \otimes h_1)(t)=\beta_1\exp(j\phi_1)s_1(t-\tau_1)$ and $\tilde{s}_2(t)=(s_2 \otimes h_2)(t)=\beta_2\exp(j\phi_2)s_2(t-\tau_2)$, respectively.

The noise at the receiver input is denoted by $n(\bullet)$, and is assumed to be Additive White Gaussian (AWG) distributed, with both real and imaginary parts having a double-sided power spectral density equal to $N_0$.

The receiver signal is denoted by $r(\bullet)$, and is equal to $r(t)=\tilde{s}_1(t)+\tilde{s}_2(t)+n(t)$.

For ease of notation, $\bar{\gamma}=E_m/(4N_0)$ is set.

The Spatial Modulation (SM) concept is based on the rule as follows: i) when message $m_1$ has to be transmitted, a properly designed signal $s_{1(t)} \neq 0$ is sent by only the transmit-antenna TX$_1$ (i.e., $s_2(t)=0$), and ii) when message $m_2$ has to be transmitted, a properly designed signal $s_2(t) \neq 0$ is sent by only the transmit-antenna TX$_2$ (i.e., $s_1(t)=0$). In other words, only one transmit-antenna is activated when either $m_1$ or $m_2$ have to be sent: there is only one active transmit-antenna for each signalling time-interval $T_m$. Furthermore, the active transmit-antenna is also allowed to transmit modulated data and, as a consequence, information is conveyed by both a transmit-antenna index and the modulated signal transmitted by that transmit-antenna. This is incorporated in the power allocation method described herein.

It is assumed that the transmitted signals, when different from zero, are pure sinusoidal tones, i.e., $s_1(t)=\sqrt{E_{m_1}}\exp(j\omega_c t)$ and $s_2(t)=\sqrt{E_{m_2}}\exp(j\omega_c t)$. In such a case, we have:

$$\begin{cases} \tilde{s}_1(t) = \beta_1 \sqrt{E_{m_1}} \exp(j\varphi_1)\exp(j\omega_c t) \\ \tilde{s}_2(t) = \beta_2 \sqrt{E_{m_2}} \exp(j\varphi_2)\exp(j\omega_c t) \end{cases} \quad (1)$$

where, with a slight abuse of notation, both delays $\tau_1$ and $\tau_2$ have been embedded into the channel phases $\phi_1$ and $\phi_2$, respectively. As a consequence, the received signal is:

$$\begin{cases} r(t)|_{m_1} = \underbrace{\beta_1 \sqrt{E_{m_1}} \exp(j\varphi_1)\exp(j\omega_c t)}_{\tilde{s}_1(\cdot)} + n(t) \\ r(t)|_{m_2} = \underbrace{\beta_2 \sqrt{E_{m_2}} \exp(j\varphi_2)\exp(j\omega_c t)}_{\tilde{s}_2(\cdot)} + n(t) \end{cases} \quad (2)$$

The Maximum Likelihood (ML) optimal detector with perfect channel knowledge and time-synchronization at the receiver is as follows:

$$\hat{m} = \begin{cases} m_1 & \text{if } D_1 \geq D_2 \\ m_2 & \text{if } D_2 < D_1 \end{cases} \quad (3)$$

where:

$$\begin{cases} D_1 = \text{Re}\left\{\int_{T_m} r(t)\tilde{s}_1^*(t)dt\right\} - \frac{1}{2}\int_{T_m} \tilde{s}_1(t)\tilde{s}_1^*(t)dt \\ D_2 = \text{Re}\left\{\int_{T_m} r(t)\tilde{s}_2^*(t)dt\right\} - \frac{1}{2}\int_{T_m} \tilde{s}_2(t)\tilde{s}_2^*(t)dt \end{cases} \quad (4)$$

So, the probability of error $P_E(\bullet,\bullet)$ conditioned upon the channel impulse responses $h_1(\bullet)$ and $h_2(\bullet)$ is as follows:

$$P_E(h_1, h_2) = \frac{1}{2}P_E(h_1, h_2)\Big|_{m_1} + \frac{1}{2}P_E(h_1, h_2)\Big|_{m_2} \quad (5)$$
$$= \frac{1}{2}Pr\{D_1|_{m_1} < D_2|_{m_1}\} + \frac{1}{2}Pr\{D_2|_{m_2} < D_1|_{m_2}\}$$

After some analytical calculations, the following result can be obtained:

$$Pr\{D_1|_{m_1} < D_2|_{m_1}\} = Pr\{D_2|_{m_2} < D_1|_{m_2}\} \quad (6)$$
$$= Q\left(\sqrt{\frac{E_m}{4N_0}}\left|\sqrt{\zeta_2}\,\alpha_2 - \sqrt{\zeta_1}\,\alpha_1\right|^2\right)$$

which yields the following overall probability of error:

$$P_E(h_1, h_2) = Q\left(\sqrt{\frac{E_m}{4N_0}}\left|\sqrt{\zeta_2}\,\alpha_2 - \sqrt{\zeta_1}\,\alpha_1\right|^2\right) \quad (7)$$

Then, the ABEP over correlated Rayleigh fading channels can be obtained as follows (ABEP=$E_{h_1,h_2}\{P_E(h_1,h_2)\}$):

$$\boxed{ABEP = \frac{1}{2} - \frac{1}{2}\sqrt{\frac{\bar{\sigma}^2\bar{\gamma}}{1+\bar{\sigma}^2\bar{\gamma}}}} \quad (8)$$

where we have defined $\bar{\sigma}^2 = \tilde{\sigma}_1^2 + \tilde{\sigma}_2^2 - 2\rho\tilde{\sigma}_1\tilde{\sigma}_2$ with $\tilde{\sigma}_1^2 = \zeta_1\sigma_1^2$ and $\tilde{\sigma}_2^2 = \zeta_2\sigma_2^2$.

The result shown in (8) takes into account an arbitrary power allocation between the two transmit-antennas, i.e., in general, $\zeta_1 \neq \zeta_2$. A uniform power allocation strategy is obtained by setting $\zeta_1 = \zeta_2 = 1$.

The power imbalance between the transmit-receive wireless links is equivalent to non-uniform power allocation. This can be readily proven by considering the following facts:

1. If $\alpha_1$ and $\alpha_2$ are Rayleigh distributed RVs with Probability Density Function (PDF) $f_{\alpha_1}(\xi_1) \sim R(\xi_1;\sigma_1)$ and $f_{\alpha_2}(\xi_2) \sim R(\xi_2;\sigma_2)$ as follows, respectively:

$$f_{\alpha_1}(\xi_1) = \frac{\xi_1}{\sigma_1^2}\exp\left(-\frac{\xi_1^2}{2\sigma_1^2}\right) \quad (9)$$

$$f_{\alpha_2}(\xi_2) = \frac{\xi_2}{\sigma_2^2}\exp\left(-\frac{\xi_2^2}{2\sigma_2^2}\right) \quad (10)$$

2. Then, $\tilde{\alpha}_1 = \sqrt{\zeta_1}\alpha_1$ and $\tilde{\alpha}_2 = \sqrt{\zeta_2}\alpha_2$ are still Rayleigh distributed RVs with PDFs equal to $f_{\tilde{\alpha}_1}(\xi_1) \sim R(\xi_1;\sqrt{\zeta_1}\sigma_1)$ and $f_{\tilde{\alpha}_2}(\xi_2) \sim R(\xi_2;\sqrt{\zeta_2}\sigma_2)$, respectively.

In the light of 1. and 2., it follows that even though $\sigma_1 = \sigma_2$, which corresponds to a balanced fading scenario, the net effect of a non-uniform power allocation, $\zeta_1 \neq \zeta_2$, in (8) is equivalent to have an unbalanced fading scenario with power imbalance ratio equal to $E\{\tilde{\alpha}_1^2\}/E\{\tilde{\alpha}_2^2\} = \zeta_1/\zeta_2$. As a consequence, the ABEP depicted in FIGS. 1 to 4 for the balanced fading scenario can be moved towards the ABEP of the unbalanced fading scenario via an adequate and opportunistic (i.e., which depends also on the fading parameters—see, e.g., FIG. 3) power allocation scheme.

To formalize the power allocation mechanism, a general system setup with $N_t$ transmit-antennas and one receive-antenna is considered, as shown for example in FIG. 5. Further generalizations to an arbitrary number of receive-antennas are possible provided that closed-form and accurate expressions of the ABEP are computed. A general fading scenario with Nakagami-m fading (the same channel model considered in FIGS. 1 to 4) is also considered. For illustrative purposes, the power allocation optimization is formulated by considering the ABEP for uncorrelated fading channels and for a receiver having full channel state information (CSI). However, the same method can be used for correlated fading channels and for other sub-optimal receiver architectures.

Figure 6:
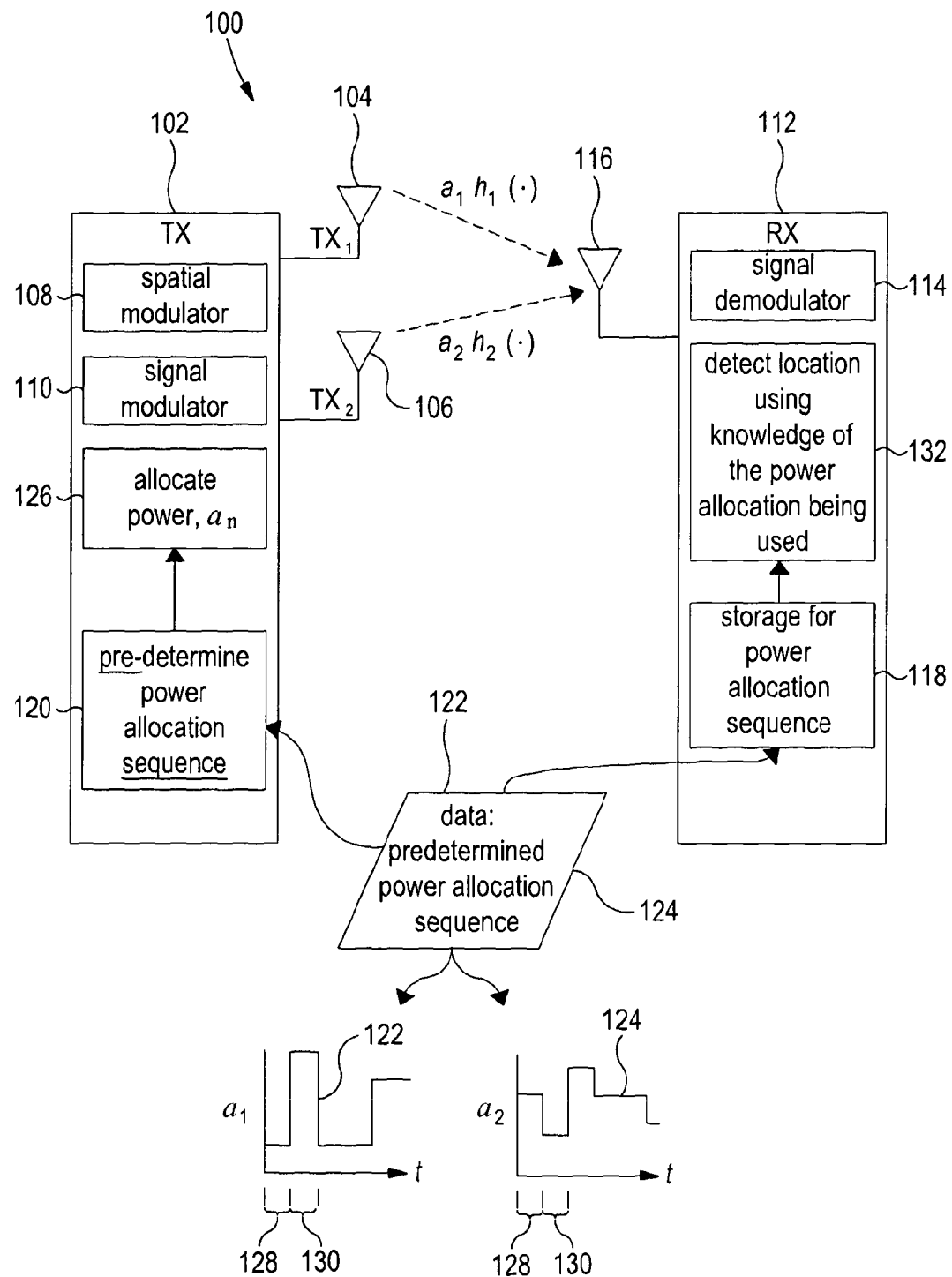
FIG. 6 shows a system setup for SM-MIMO, in accordance with another embodiment of the present invention, by way of example.
Figure 7:
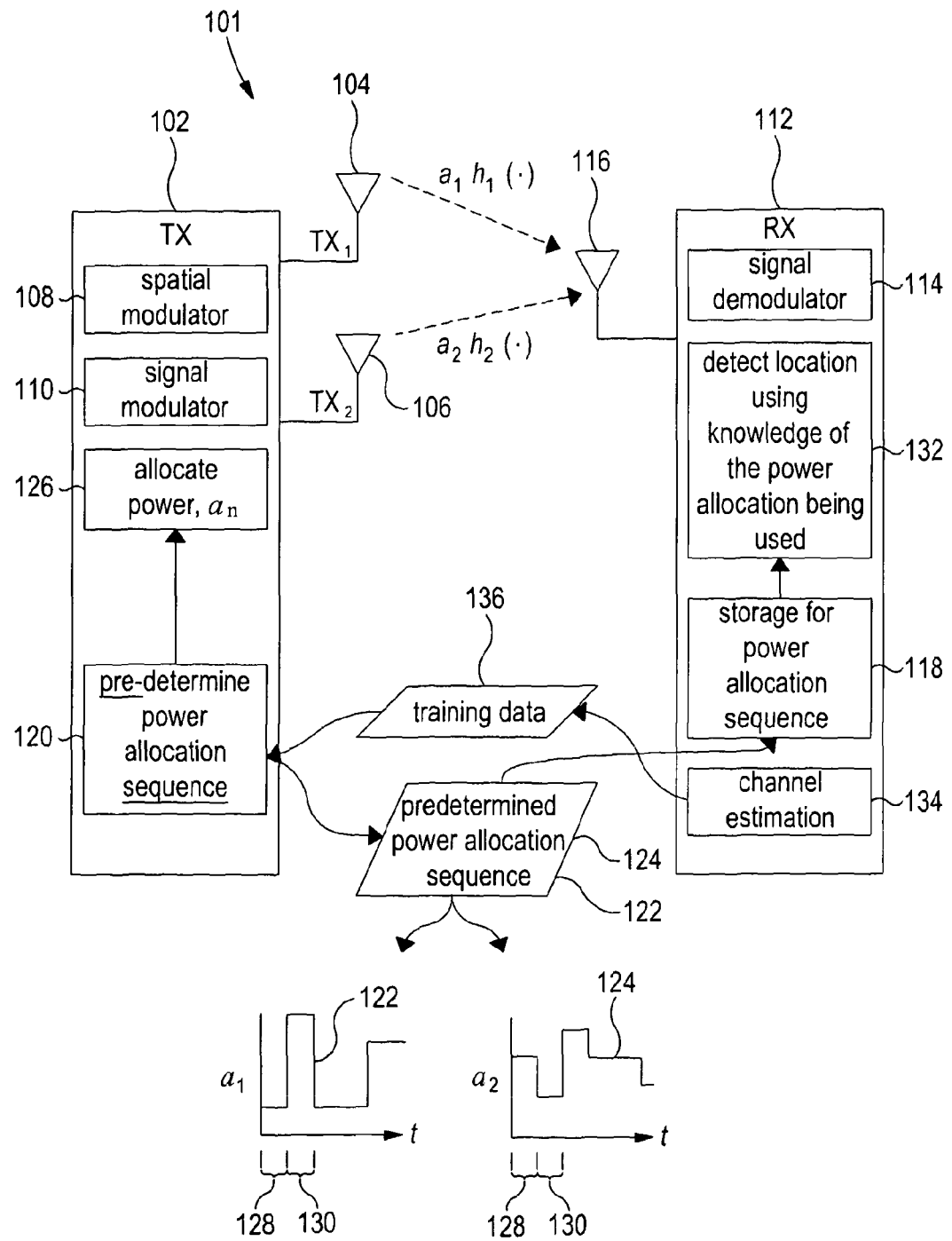
FIG. 7 shows a system setup for SM-MIMO, in accordance with a further embodiment of the present invention, by way of example.

In FIGS. 5, 6 and 7, $a_n$, and $a_1$ and $a_2$ respectively, denote the power scaling variables. Furthermore, $c_{1,2}$ denotes the correlation coefficient between the channels.

The transmitter 16 comprises a spatial modulator 26 and a signal modulator 28. At the receiver 20, a signal demodulator 30 is located. The receiver also comprises a channel estimator 32 which determines correlation coefficients between the channels 22, 24. These correlation coefficients are transmitted to the transmitter 16. The transmitter 16 comprises a calculator 34 to determine a power allocation to be allocated to the transmit-antennas 12, 14 on the basis of data 35 comprising correlation coefficients measured at the receiver 20. The transmitter 16 further comprises a power allocator 36 to allocate the determined power to the transmit-antennas 12, 14. A modulated signal is then transmitted from one transmit-antenna 12, 14 at a time with the corresponding allocated power. At the receiver 20, a model of power allocation is generated in a model generator 38, in which the data 35 of the channel estimator 32 is applied. The location of the transmit-antennas 12, 14 is then determined in a detector 40 located at the receiver 20 by using the power allocation model.

In the depicted scenario, the ABEP can be written in closed-form as follows:

$$ABEP(\zeta_1, \zeta_2, \ldots, \zeta_{N_t}) \cong \frac{1}{2(N_1 - 1)} \sum_{i=1}^{N_t} \sum_{i \neq j=1}^{N_t} PEP(i \to j; \zeta_1, \zeta_2, \ldots, \zeta_{N_t}) \quad (11)$$

where it is denoted $$E_{m_1} = \zeta_1 E_m, E_{m_2} = \zeta_2 E_m, \ldots, E_{m_{N_1}} = \zeta_{N_1} E_m,$$

and emphasized that the above ABEP is conditioned upon a fixed power allocation among the transmit-antennas, i.e., the set $(\zeta_1, \zeta_2, \ldots, \zeta_{N_t})$. Moreover, we have defined:

$$PEP(i \to j; \zeta_1, \zeta_2, \ldots, \zeta_{N_t}) = \frac{1}{\pi} \int_0^{\pi/2} M_{i \to j}\left(\frac{\overline{\gamma}}{2\sin^2(\theta)}\right) d\theta \quad (12)$$

and:

$$M_{i \to j}(s) = \frac{A_i A_i}{4}(s + B_i)^{-\left(\frac{1}{2} + \frac{C_i}{2}\right)}(s + B_i)^{-\left(\frac{1}{2} + \frac{C_i}{2}\right)}$$
$$G_{2,3}^{1,2}\left(-\frac{s^2}{(s + B_i)(s + B_j)} \middle| \begin{array}{cc} 0.5 - 0.5C_i & 0.5 - 0.5C_i \\ 0 & 0 \end{array}\right) \quad (13)$$

with $$G_{p,q}^{m,n}\left(\cdot \middle| \begin{array}{c} (a_p) \\ (a_q) \end{array}\right)$$

being the Meijer-G function, and $A_i = 2m_i^{m_i}/(\tilde{\Omega}_i^{m_i} \Gamma(m_i))$, $B_i = m_i/\tilde{\Omega}_i$, $C_i = 2m_i - 1$, $\tilde{\Omega}_1 = \zeta_i \Omega_i$, for $i = 1, 2, \ldots, N_t$. Moreover, $(m_i, \Omega_i)$ are the parameters of the Nakagami-m distribution for the i-th wireless link.

The optimal and opportunistic power allocation mechanism based on the optimization of the ABEP can be analytically formalized as follows:

$$\left(\zeta_1^{(opt)}, \zeta_2^{(opt)}, \ldots, \zeta_{N_t}^{(opt)}\right) = \underset{\substack{(\zeta_1, \zeta_2, \ldots, \zeta_{N_t}) \\ \zeta_1 + \zeta_2 + \ldots + \zeta_{N_t} = 1}}{\operatorname{argmin}} \{ABEP(\zeta_1, \zeta_2, \ldots, \zeta_{N_t})\} \quad (14)$$

where the constraint that the total power is fixed to a given value, i.e., $\Sigma_{i=1}^{N_t} E_{m_i} = E_m$ has been added.

The minimization in (14) turns out to be a constrained optimization problem, which can be solved via either analytical or numerical methods.

In FIG. 6, a second embodiment of a system 100 according to the present invention is shown. A transmitter 102 is provided with two transmit-antennas 104, 106 and further comprises a spatial modulator 108 and a signal modulator 110. At a receiver 112, a signal demodulator 114 is located. The receiver 112 has a receive-antenna 116 and also comprises a storage 118 for storing power allocation sequences, for example in a look-up table. The transmitter 102 comprises a sequence predetermination module 120 in which a power allocation sequence 122, 124 to be allocated to the transmit-antennas 104, 106 is predetermined. This power allocation sequence 122, 124 is randomly chosen prior to any data transmission from the transmit-antennas to the receiver 112 and does not consider channel conditions. The transmitter 102 further comprises a power allocator 126 to allocate the predetermined power allocation sequences to the transmit-antennas 104, 106. A modulated signal is then transmitted from the transmit-antennas 104, 106, i.e. from the transmit-antenna 104, 106 which is active at a certain time interval, with the corresponding power allocation sequence. The power allocation sequences 122, 124 of two transmit-antennas, which are shown in more detail, are only an example of possible power allocation sequences. The power allocation sequences 122, 124 are shown as a function of time (t). They have a staircase-shaped characteristic which differs for each of the transmit-antennas. For example, in a first time interval 128, the power ($a_1$) of the first transmit-antenna 104 is lower than the power ($a_2$) of the second transmit-antenna 106. Then, in a second time interval 130, the power ($a_1$) of the first transmit-antenna 104 is higher than the power ($a_2$) of the second transmit-antenna 106. The power allocation sequences 122, 124 of each transmit-antenna 104, 106 are transmitted to the receiver 110 and stored in the storage 118. The receiver 112 further comprises a detector 132 to detect location of the active transmit-antenna by using the power allocation sequence data stored in the storage 118.

FIG. 7 shows a further embodiment of a system 101 according to the present invention by way of example. In this embodiment is similar to the embodiment shown in FIG. 6 and therefore, the same reference signs are used for similar items. However, channel conditions are considered prior to the allocation of a power allocation sequence 122, 124 to the transmit-antennas 104, 106. Therefore, the receiver 112 further comprises a channel estimator 134. Training data 136 is transmitted from the receiver 112 to the transmitter 102, containing channel information that has been analyzed in the channel estimator 134. The channel information mainly comprises gain, phase and/or delay of the signals received at the receiver 112 from different transmit-antennas. The training data provides a feedback to the transmitter 102 such that the power allocation sequence 124, 126 is randomly chosen based the channel information. The predetermined power allocation sequence 124, 126 is transmitted to the receiver 112 again to be stored in the storage 118 which is accessible for the detector 132 to determine the location of the active transmit-antenna.

With regard to the embodiments shown in FIGS. 6 and 7, it is also possible that a constant power ($a_1$, $a_2$) is allocated to each of the transmit-antennas 104, 106, such that $a_1 \neq a_2$. The difference between these constant powers can depend on the channel correlation, for example, the difference can be direct proportional to the channel correlation.

Another aspect of the invention focuses on proposing a novel Spatial Modulation method, which is called Time-Orthogonal Signal Design assisted Spatial Modulation (TOSD-SM) and, differently from all other SM techniques, can exploit the antennas at the transmitter to get transmit-diversity. The basic idea behind TOSD-SM is not restricting the transmitted signal to be a pure sinusoidal tone, but to properly design it in order to exploit, in an efficient way, the different propagation delays ($\tau_1$ and $\tau_2$) of the wireless links $TX_1$-RX and $TX_2$-RX.

Similar to the first aspect of the invention, TOSD-SM retains the main assumption that only one transmit-antenna is activated for every signalling interval $T_m$. In particular, also in this aspect, the following rule is adopted: i) when message $m_1$ has to be transmitted, a properly designed signal $s_1(t) \neq 0$ is sent by only the antenna $TX_1$ (i.e., $s_2(t)=0$), and ii) when message $m_2$ has to be transmitted, a properly designed signal $s_2(t) \neq 0$ is sent by only the antenna $TX_2$ (i.e., $s_1(t)=0$). The assumption that only one transmit-antenna is activated for every signalling interval $T_m$ can also be used for more than two antennas.

TOSD-SM does not restrict the transmitted signals to be pure sinusoidal tones, but $s_1(\bullet)$ and $s_2(\bullet)$ are properly optimized for performance improvement. In particular, the novel TOSD-SM concept relies on the following signal design (when $s_1(\bullet)$ and $s_2(\bullet)$ are different from zero):

$$s_1(t)=s_2(t)=w(t) \qquad (18)$$

where $w(\bullet)$ is a generic signal waveform, which is chosen to satisfy the following co $$R_w(\tau) = \int_{-\infty}^{+\infty} w(\xi)w^*(\xi - \tau)d\xi = \delta(\tau) \qquad (19)$$

The design condition in (19) simply states that $w(\bullet)$ is required to have a very peaky time auto-correlation function $R_w(\bullet)$, which under ideal signal design conditions can be assumed to be a Dirac's delta function.

According to (18), the signals after propagation through the wireless channels can be written as follows:

$$\begin{cases} \tilde{s}_1(t) = \beta_1 \sqrt{E_m} \exp(j\varphi_1) w(t-\tau_1) \\ \tilde{s}_2(t) = \beta_2 \sqrt{E_m} \exp(j\varphi_2) w(t-\tau_2) \end{cases} \qquad (20)$$

As a consequence, the received signal is:

$$\begin{cases} r(t)|_{m_1} = \underbrace{\beta_1 \sqrt{E_m} \exp(j\varphi_1) w(t-\tau_1)}_{s_1(\cdot)} + n(t) \\ r(t)|_{m_2} = \underbrace{\beta_2 \sqrt{E_m} \exp(j\varphi_2) w(t-\tau_2)}_{s_2(\cdot)} + n(t) \end{cases} \qquad (21)$$

The ML optimal detector with perfect channel knowledge and synchronization at the receiver is as follows:

$$\hat{m} = \begin{cases} m_1 & \text{if } D_1 \geq D_2 \\ m_2 & \text{if } D_2 < D_1 \end{cases} \qquad (22)$$

where:

$$\begin{cases} D_1 = \text{Re}\left\{\int_{T_m} r(t)\tilde{s}_1^*(t)dt\right\} - \frac{1}{2}\int_{T_m} \tilde{s}_1(t)\tilde{s}_1^*(t)dt \\ D_2 = \text{Re}\left\{\int_{T_m} r(t)\tilde{s}_2^*(t)dt\right\} - \frac{1}{2}\int_{T_m} \tilde{s}_2(t)\tilde{s}_2^*(t)dt \end{cases} \qquad (23)$$

Similar to (5), the probability of error $P_E(\bullet,\bullet)$ conditioned upon the channel impulse responses $h_1(\bullet)$ and $h_2(\bullet)$ is as follows:

$$P_E(h_1, h_2) = \frac{1}{2} P_E(h_1, h_2)\big|_{m_1} + \frac{1}{2} P_E(h_1, h_2)\big|_{m_2} \qquad (24)$$

$$= \frac{1}{2} Pr\{D_1|_{m_1} < D_2|_{m_1}\} + \frac{1}{2} Pr\{D_2|_{m_2} < D_1|_{m_2}\}$$

After some analytical calculations and the exploitation of the orthogonality condition in (19) for every pair of delays $(\tau_1, \tau_2)$ with $\tau_1 \neq \tau_2$, (i.e., propagation through the wireless links $TX_1$-RX and $TX_2$-RX is subject to different delays), i.e.:

$$\int_{-\infty}^{+\infty} w(\xi - \tau_1)w^*(\xi - \tau_2)d\xi = \int_{-\infty}^{+\infty} w(\xi)w^*[\xi - (\tau_2 - \tau_1)]d\xi \qquad (25)$$

$$= \delta(\tau_2 - \tau_1) = \begin{cases} 1 & \text{if } \tau_1 = \tau_2 \\ 0 & \text{if } \tau_1 \neq \tau_2 \end{cases}$$

the result in what follows can be obtained:

$$Pr\{D_1|_{m_1} < D_2|_{m_1}\} = Pr\{D_2|_{m_2} < D_1|_{m_2}\} = Q\left(\sqrt{\frac{E_b}{4N_0}(\beta_1^2 + \beta_2^2)}\right) \qquad (26)$$

which yields the following overall probability of error:

$$P_E(h_1, h_2) = Q\left(\sqrt{\frac{E_b}{4N_0}(\beta_1^2 + \beta_2^2)}\right) \qquad (27)$$

Then, $\overline{P}_E$ over Rayleigh fading channels can be obtained as follows:

$$\overline{P}_E = \frac{1}{\pi} \int_0^{\pi/2} M\left(\frac{\overline{\gamma}}{2\sin^2(\theta)}\right) d\theta \qquad (28)$$

where we have defined $M(s)=[1+2(\sigma_1^2+\sigma_2^2)s+4(1-\rho^2)\sigma_1^2\sigma_2^2 s^2]^{-1}$, which is the Moment Generating Function (MGF) of $\beta=\beta_1+\beta_2$, i.e., $M(s)=E\{\exp(-s\beta)\}$.

The main advantage of this aspect of the invention is to provide transmit-diversity. In particular, for a 2×1 MISO system a transmit-diversity order equal to 2 is obtained. In particular, the diversity order can be computed by analyzing the behaviour of $M(\bullet)$ for large values of $|s|$. It can be readily proven that:

$$\lim_{s \to +\infty} \{M(s)\} \cong \frac{1}{4(1-\rho^2)\sigma_1^2\sigma_2^2} |s|^{-2} \qquad (29)$$

and it is known that the system's diversity order is equal to the negative exponent of $|s|$, i.e., 2 in (29).

As a result of the higher diversity order, the error probability is expected to have a steeper slope for increasing SNRs, which results in substantial improvements in system's performance. This aspect of the invention turns out to be also more robust to channel correlation. As a matter of fact, the error probability in (28) depends on only the square value of the correlation coefficient, i.e., $\rho^2$. So, since $0 \leq \rho \leq 1$ the performance drop for increasing $\rho$ is expected to be smaller than in known solutions. As opposed to known solutions in which the performance of the SM scheme is independent of $\rho$, a transmit-diversity is achieved.

With respect to other SM schemes, it might be required that the propagation delays $(\tau_1, \tau_2)$ are known at the transmitter. When needed, this can be easily obtained via a feedback channel from the receiver to the transmitter, such that the orthogonality condition in (25) can always be verified. On the other hand, when the signal design condition in (19) can be guaranteed, a priori, for every $(\tau_1, \tau_2)$ pair, no feedback channel is required since the condition in (25) is implicitly verified for every pair $(\tau_1, \tau_2)$ at the receiver-side. In addition to or instead of propagation delays, other channel signatures (or spectral characteristics) such as phase rotation, amplitude or frequency may be used.

Below, numerical results which are obtained from the analytical frameworks described above, are described. The following system setup is used to obtain the simulation results:
i) $\sigma_1 = \sigma_2 = 1$,
ii) $\rho = \{0.00, 0.25, 0.50, 0.75, 0.99\}$,
iii) $N_0 = -204$ dBW/Hz, and
iv) the error probability from Monte Carlo simulations is obtained by requiring a number of wrong detections equal to $10^4$.

Figure 8:
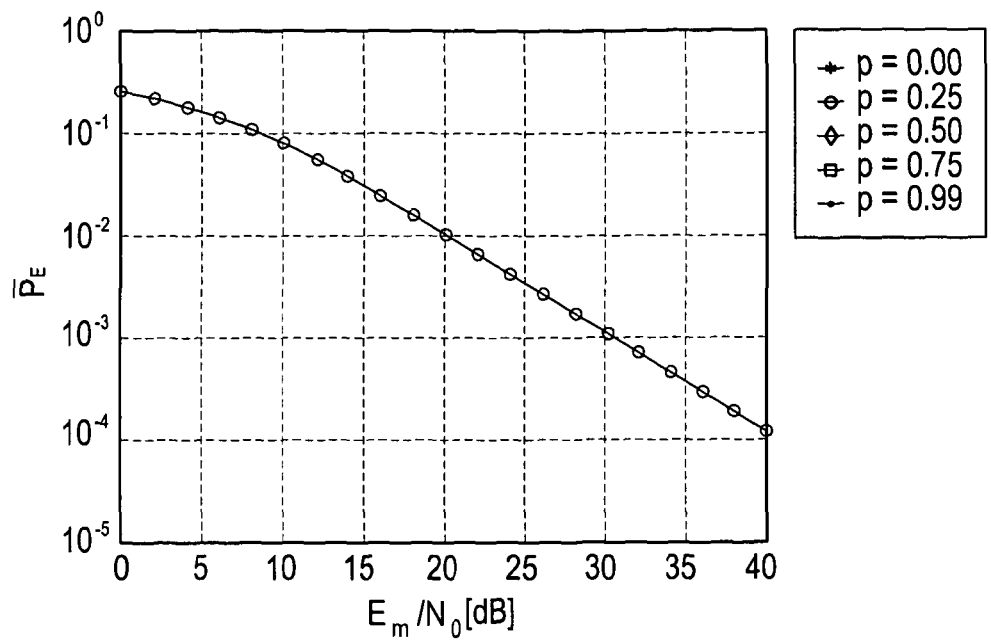
FIG. 8 shows numerical results obtained when employing a scheme according to the prior art.
Figure 9:
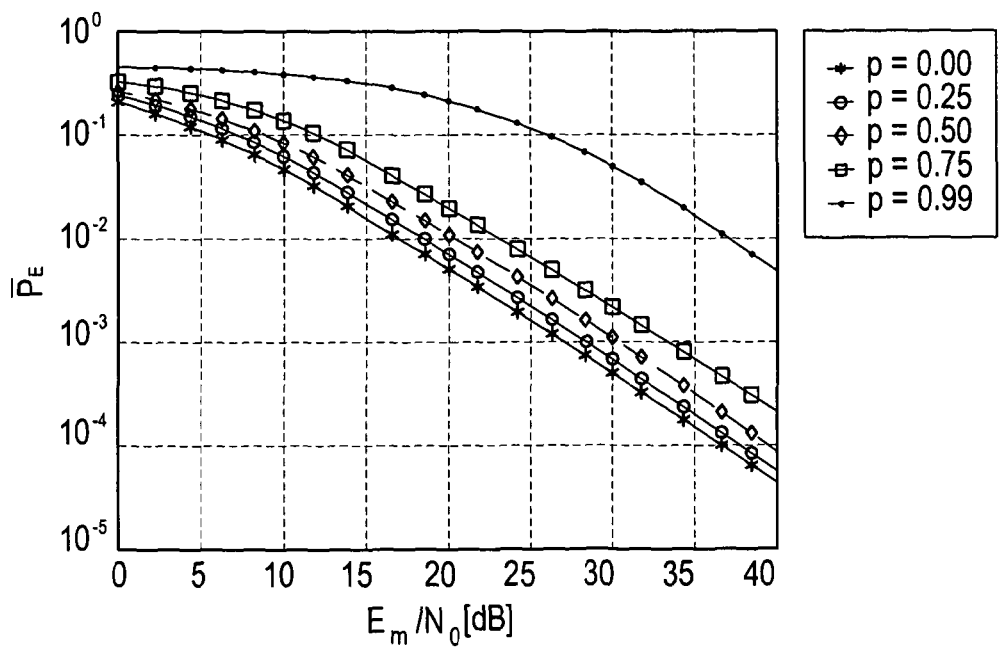
FIG. 9 shows numerical results obtained when employing another scheme according to the prior art.
Figure 10:
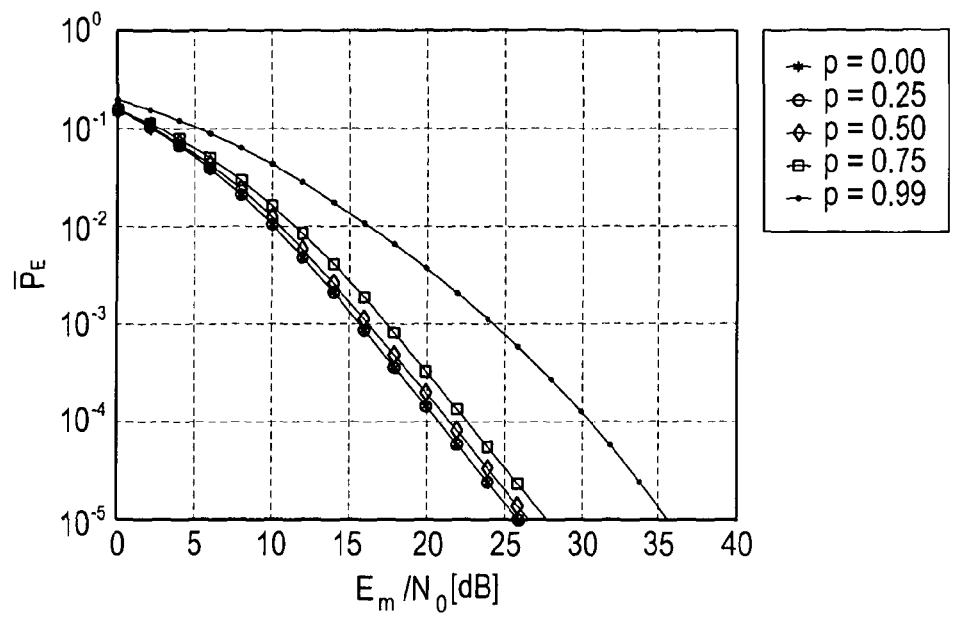
FIG. 10 shows numerical results obtained when employing the Time-Orthogonal Signal Design (TOSD)-SM scheme according to an aspect of the invention.

Numerical results are shown in FIG. 8, FIG. 9, and FIG. 10 for known SM schemes and the proposed TOSD-SM, respectively. Markers show a Monte Carlo simulation and solid lines show the analytical model.

In particular, FIG. 8 shows the error probability of a SM scheme which is called Space Shift Keying (SSK) and based on the rule that only one transmit-antenna is activated when $m_1$ has to be sent, while both transmit-antennas are activated when $m_2$ needs to be sent. In this scheme, the transmitted signals, when different from zero, are always pure sinusoidal tones. This allows to embed both delays $(\tau_1$ and $\tau_2)$ into the channel phases $\phi_1$ and $\phi_2$, respectively. Numerical results confirm that no performance degradation can be observed for increasing values of the correlation coefficient.

In FIG. 9, the error probability of another SM scheme, based on the rule that only one transmit-antenna is activated when either $m_1$ or $m_2$ have to be sent: there is only one active transmit-antenna for every signaling interval $T_m$. Similar to the SSK scheme the transmitted signals, when different from zero, are always pure sinusoidal tones, i.e., $s_1(t) = s_2(t) = \sqrt{E_m} \exp(j\omega_c t)$. Thus, also in this case both propagation delays $\tau_1$ and $\tau_2$ can be embedded into the channel phases $\phi_1$ and $\phi_2$, respectively. It is observed that the spatial correlation between the wireless links can remarkably increase the error probability. When the wireless links are subject to high correlation, the error probability can be very high. More in detail, the SNR penalty with respect to spatial correlation is 1.24 dB, 3 dB, and 6 dB for $\rho = 0.25$, $\rho = 0.5$, and $\rho = 0.75$, respectively.

In FIG. 10, the error probability for the novel TOSD-SM scheme is depicted. Numerical results confirm that the proposed invention shows a higher diversity order than other SM schemes: the error probability shows a steeper slope than the other two proposals. This yields a substantial performance gain with respect to other solutions. Moreover, we can observe that spatial correlation of wireless links has a significant less impact than the SM proposal as described in relation with FIG. 9.

Figure 11:
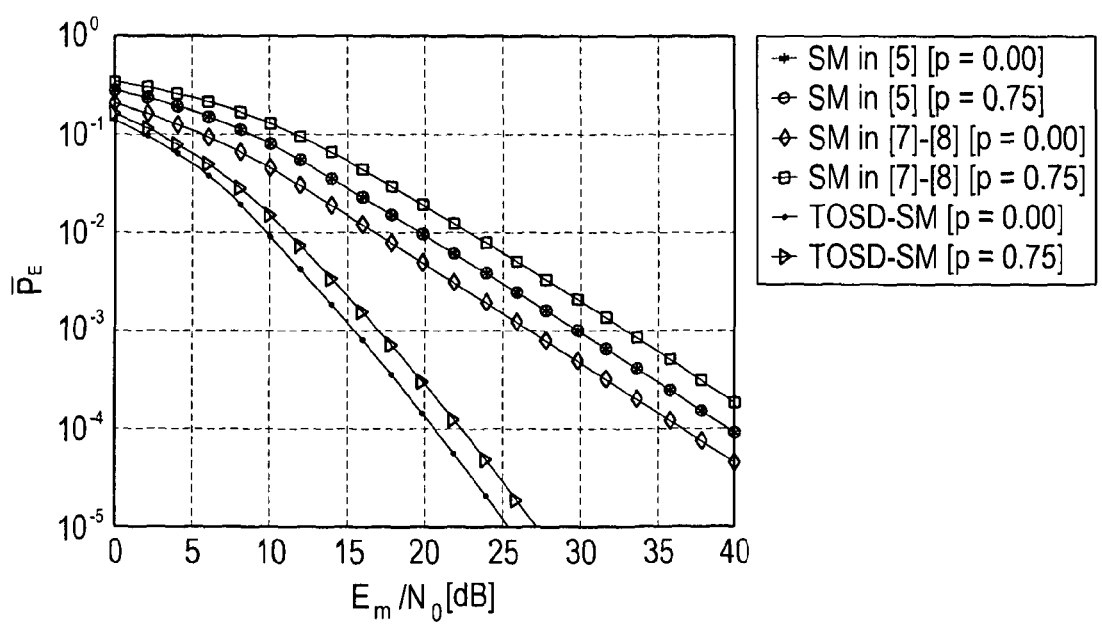
FIG. 11 shows a comparison among various Spatial Modulation proposals.

In FIG. 11 a comparison among the various SM proposals is shown in order to understand the different behaviour of them as a function of channel spatial correlation. The following facts can be observed:

i) The proposed TOSD-SM yields a significant performance gain with respect to all other SM proposals and, even in the presence of channel correlation, it offers better error probabilities than other SM schemes over independent wireless links: this is a clear indication of the robustness of the proposed invention to spatial correlation of fading.

ii) The SM proposal referring to Space Shift Keying offers worse performance than the SM scheme of which results are shown in FIG. 9 when the wireless links are uncorrelated. However, in the presence of channel correlation the situation is reversed: SM for SSK offers a better error probability than for the SM scheme which results are shown in relation to FIG. 9.

Figure 12:
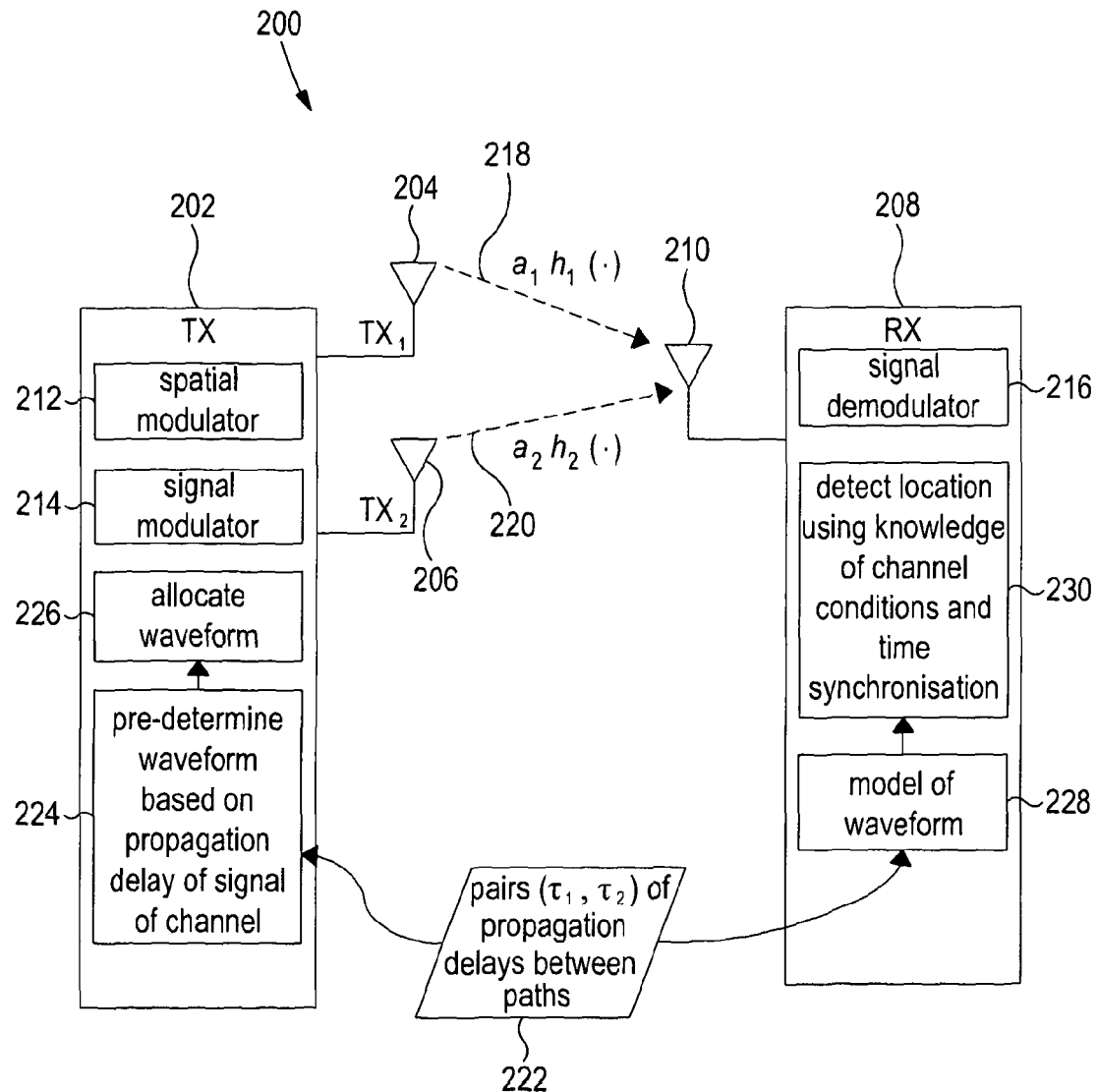
FIG. 12 shows a system setup for SM-MIMO, in accordance with an embodiment of the TOSD-SM scheme, by way of example.

FIG. 12 shows a system 200 for SM-MIMO, in accordance with an embodiment of the TOSD-SM scheme. The system 200 comprises a transmitter 202 with two transmit-antennas 204, 206 and a receiver 208 with one receive-antenna 210. The transmitter 202 comprises a spatial modulator 212 and a signal modulator 214. The receiver 208 comprises a signal demodulator 216 for demodulating a signal which is sent over a channel 218, 220 from one transmit-antenna 204, 206 to the receive-antenna 210. Each signal transmitted over the channels 218, 220 has a specific waveform. According to the TOSD-SM scheme, the waveform of the signal is predetermined prior to any data transmission between the transmitter 202 and the receiver 208 such that a propagation delay of the signals is modified. Corresponding data 222, which comprise orthogonal pairs $(\tau_1, \tau_2)$ of the propagation delay between the two channels 218, 220 are supplied to a waveform calculator 224 located at the transmitter 202. The predetermined waveform is then allocated to the corresponding signal sent by the transmit-antennas 204, 206 via a waveform allocator 226 located at the transmitter 202. The receiver 208 comprises a database 228 in which a model of waveforms is provided. The receiver 208 further comprises a detector 230 which uses knowledge of the conditions of the channels 218, 220 and the waveform model to detect location of the active transmit-antenna 204, 206. Furthermore, a time-synchronisation at the receiver 208 is considered. The resulting time-orthogonal design of the signals reduces the error probability as described above.

It should be noted that other numbers of transmit-antennas, i.e. more than two transmit-antennas at the transmitter, and receivers, i.e. more than one receive-antenna at the receiver, could equally be used.

The invention claimed is:

1. A method of spatial modulation to identify a transmitter element within a transmission array of at least two transmitter elements, each transmitter element being located at a transmitter, wherein a signal is transmitted by one active transmitter element at a time over a channel to a receiver, the method comprising the steps of:

allocating power to the transmitter elements wherein the power is allocated differently between at least two transmitter elements when active, receiving transmitted data at the receiver, and detecting location of the active transmitter element using knowledge of the power allocated to the transmitter elements.

2. A method according to claim 1, comprising the steps of:

determining an error probability of the signal, determining a power allocation model for the transmitter elements by optimizing the error probability of the signal, and wherein the step of allocating power to the transmitter elements is performed according to the determined power allocation model.

3. A method according to claim 2, wherein determining the error probability comprises determining an average bit error probability.

4. A method according to claim 1, wherein a sum of energies transmitted when data is transmitted from each transmitter element of the transmission array to the receiver is fixed to a given value; or
a power control is applied in which a sum of energies transmitted when data is transmitted from each transmitter element of the transmission array to the receiver depends on a channel environment and/or propagation of the signal.

5. A method according to claim 1, wherein a model of power allocation is generated at the receiver and optionally the location of a transmitter element is detected by using data of the model of power allocation.

6. A method according to claim 1, wherein the method comprises:
predetermining a power allocation sequence of a transmitter element;
in the step of allocating power to the transmitter elements, allocating the power allocation sequence to the transmitter elements; wherein
the step of allocating the power allocation sequence to the transmitter element comprises allocating a random sequence.

7. A method according to claim 1, comprising the steps of:
receiving transmitted training data at the receiver during a training phase; predetermining
a power allocation sequence according to received training data;
in the step of allocating power to the transmitter elements, allocating the power allocation sequence to the transmitter elements;
terminating the training phase;
receiving transmitted data at the receiver after the training phase; and
in the step of detecting location of the active transmitter element, using knowledge of the power allocation sequence of the active transmitter element.

8. A method according to claim 1, wherein channel state information is considered to determine a power allocation sequence of the related transmitter elements prior to allocating the power allocation sequence to the transmitter element.

9. Transmission apparatus for identifying a transmitter-element within a transmission array of at least two transmitter-elements, each transmitter-element being located at a transmitter, wherein a signal is transmitted by one active transmitter-element at a time over a channel to a receiver, the transmission apparatus comprising:
a power allocator to allocate power to the transmitter-elements wherein the power is allocated differently between at least two transmitter-elements when active.

10. Transmission apparatus according to claim 9, comprising a calculator to determine a power allocation model for the transmitter-elements by optimizing an average bit error probability of the signal, wherein the power allocator allocates power to the transmitter-elements according to the determined power allocation model.

11. Transmission apparatus according to claim 9, wherein each channel has a unique impulse response, and wherein the transmission apparatus comprises a sequence predetermination module to predetermine a power allocation sequence of a transmitter element, wherein the power allocator allocates the power allocation sequence to the transmitter elements.

12. Transmission apparatus according to claim 9, wherein the transmitter elements each have one of a loudspeaker, an ultrasound transmitter or a multiple light emitting diode.

13. Receiver apparatus for identifying a transmitter-element within a transmission array of at least two transmitter-elements, each transmitter-element being located at a transmitter, wherein a signal is transmitted by one active transmitter-element at a time over a channel to the receiver apparatus, the receiver apparatus being configured to receive transmitted data and having a location detector to detect location of the active transmitter-element using knowledge of the power allocated to the transmitter-elements, wherein the power allocated to the transmitter-elements is allocated differently between at least two transmitter elements when active.

14. Receiver apparatus according to claim 13, the receiver apparatus comprising a channel estimator to determine an error probability of the signal; and a model generator to determine a power allocation model for the transmitter-elements by optimizing the error probability of the signal.

15. Receiver apparatus according to claim 13, wherein each channel has a unique impulse response, and wherein the location detector, in detecting location of the active transmitter element, is operable to use knowledge of a power allocation sequence of the active transmitter element.

16. Receiver apparatus according to claim 13, being operable to receive transmitted training data during a training phase to feed back training data to a transmitter apparatus for predetermining a power allocation sequence according to the training data and for allocating a power allocation sequence to the transmitter elements; and wherein the location detector, in detecting the location of the active transmitter element, is operable to use knowledge of the power allocation sequence of the active transmitter element.

17. Receiver apparatus according to claim 13, wherein the at least one receiver element has one of a detector for radio frequency, acoustic or ultrasound signals or a photo detector.

18. Spatial modulation system for identifying a transmitter-element within a transmission array of at least two transmitter-elements, each transmitter-element being located at a transmitter, wherein a signal is transmitted by one active transmitter-element at a time over a channel to a receiver, the system having a transmission apparatus as claimed in claim 9 and a receiver apparatus as claimed in claim 13.

19. Spatial modulation system according to claim 18, wherein the channel comprises an optical wireless link.

20. A non-transitory computer program product containing one or more sequences of machine-readable instructions for spatial modulation to identify a transmitter-element within a transmission array of at least two transmitter-elements, each transmitter-element being located at a transmitter, wherein a signal is transmitted by one active transmitter-element at a time over a channel to a receiver, the machine-readable instructions contained on said non-transitory computer program product being configured to execute one or more processors to:
allocate power to the transmitter-elements wherein the power is allocated differently between at least two transmitter-elements when active;
receive transmitted data at the receiver; and
detect location of the active transmitter-element using knowledge of the power allocated to the transmitter-elements.

21. A non-transitory computer program product containing one or more sequences of machine-readable instructions for implementing the method according to claim 1 when the machine-readable instruction are run on a computer.

22. A method of spatial modulation to identify a transmitter within a transmission array of at least two transmitter elements, wherein a signal is transmitted by one active transmitter element at a time over a channel to a receiver, the method comprising:
  predetermining a waveform of the signal prior to transmitting it to the receiver;
  wherein channel signatures of two different channels form a pair of channel signatures respectively; and
  wherein the waveform is predetermined to exploit the pair of channel signatures to cause a difference between signals transmitted over the different channels;
  receiving transmitted data at the receiver; and
  detecting location of the active transmitter element using the difference between the transmitted signals.

23. A method according to claim 22, wherein propagation delays of the channel signatures and/or an orthogonality condition of the pair of channel signatures and/or a delta function of the waveform of the signal is/are detected.

24. A method according to claim 22, wherein the signals transmitted to the receiver are sent with a similar or equal energy from each of the transmitter elements.

25. Transmission apparatus for identifying a transmitter within a transmission array of at least two transmitter elements, wherein a signal is transmitted by one active transmitter element at a time over a channel to a receiver, the transmission apparatus comprising:
  a waveform calculator to predetermine a waveform of the signal prior to transmitting it to the receiver; wherein
  channel signatures of two different channels form a pair of channel signatures respectively, and
  the waveform is predetermined to exploit the pair of channel signatures to cause a difference between signals transmitted over the different channels.

26. Transmission apparatus according to claim 25, wherein the transmitter elements each have one of a loudspeaker, an ultrasound transmitter or a multiple light emitting diode.

27. Spatial modulation system for identifying a transmitter-element within a transmission array of at least two transmitter-elements, each transmitter-element being located at a transmitter, wherein a signal is transmitted by one active transmitter-element at a time over a channel to a receiver, the system comprising the transmission apparatus according to claim 25 and a receiver apparatus operable to receive transmitted data and detect location of the active transmitter element using the difference between the transmitted signals.

28. Spatial modulation system according to claim 27, wherein the channel comprises an optical wireless link.

29. Spatial modulation system according to claim 27, wherein the receiver apparatus comprises at least one receiver element, and wherein the at least one receiver element is one of a detector for radio frequency, acoustic or ultrasound signals or a photo detector.

30. A non-transitory computer program product containing one or more sequences of machine-readable instructions for spatial modulation to identify a transmitter within a transmission array of at least two transmitter elements, wherein a signal is transmitted by one active transmitter element at a time over a channel to a receiver, the machine-readable instructions contained on said non-transitory computer program product being configured to execute one or more processors to:
  predetermine a waveform of the signal prior to transmitting it to the receiver; wherein
  channel signatures of two different channels form a pair of channel signatures respectively;
  and wherein the waveform is predetermined to exploit the pair of channel signatures to cause a difference between signals transmitted over the different channels;
  receive transmitted data at a receiver; and
  detect location of the active transmitter element using the difference between the transmitted signals.

31. A non-transitory computer program product containing one or more sequences of machine-readable instructions for implementing the method according to claim 22 when the machine-readable instruction are run on a computer.

* * * * *